United States Patent
Kameda et al.

(10) Patent No.: US 8,115,764 B2
(45) Date of Patent: Feb. 14, 2012

(54) MAP DISPLAY SYSTEM, MAP DATA PROCESSING APPARATUS, MAP DISPLAY APPARATUS, AND MAP DISPLAY METHOD

(75) Inventors: Kenji Kameda, Tokyo (JP); Natsuo Koda, Kanagawa (JP); Junpei Ito, Tokyo (JP); Hisanori Nagata, Tokyo (JP)

(73) Assignee: Sony Corporation, Tokyo (JP)

( * ) Notice: Subject to any disclaimer, the term of this patent is extended or adjusted under 35 U.S.C. 154(b) by 907 days.

(21) Appl. No.: 10/901,549

(22) Filed: Jul. 29, 2004

(65) Prior Publication Data

US 2005/0035883 A1   Feb. 17, 2005

(30) Foreign Application Priority Data

Aug. 1, 2003   (JP) ................ P2003-285206

(51) Int. Cl.
  *G06T 17/00*   (2006.01)
  *G06T 17/30*   (2006.01)
  *G06F 7/00*   (2006.01)
(52) U.S. Cl. ........ 345/420; 707/790; 707/791; 707/797; 707/802; 707/809
(58) Field of Classification Search .................. 345/420; 707/790, 791, 797, 802, 809
  See application file for complete search history.

(56) References Cited

U.S. PATENT DOCUMENTS

| | | | | |
|---|---|---|---|---|
| 5,936,626 A * | 8/1999 | Beasley | ......................... | 345/582 |
| 6,259,451 B1 * | 7/2001 | Tesler | ........................... | 345/419 |
| 6,535,812 B2 * | 3/2003 | Satoh et al. | .................... | 701/208 |
| 6,850,946 B1 * | 2/2005 | Rappaport et al. | ........... | 707/101 |
| 7,042,454 B1 * | 5/2006 | Seligman | ...................... | 345/428 |
| 7,283,135 B1 * | 10/2007 | Cote et al. | ...................... | 345/428 |
| 2002/0138196 A1 * | 9/2002 | Polidi et al. | ................... | 701/208 |
| 2004/0263512 A1 * | 12/2004 | Santodomingo et al. | ...... | 345/428 |
| 2007/0027628 A1 * | 2/2007 | Geelen | .......................... | 701/213 |
| 2007/0067106 A1 * | 3/2007 | Antoine | ........................... | 702/5 |

FOREIGN PATENT DOCUMENTS

| | | |
|---|---|---|
| EP | 1435508 | 7/2004 |
| JP | 10-293862 | 11/1998 |
| JP | 2000-074678 | 3/2000 |
| JP | 2000-283777 | 10/2000 |
| JP | 2001-067457 | 3/2001 |
| JP | 2001-175662 | 6/2001 |

(Continued)

OTHER PUBLICATIONS

Lindstrom et al. ("Real-Time, Continuous Level of Detail Rendering of Height Fields", SIGGRAPH '96, Aug. 1996, pp. 109-118).*

(Continued)

*Primary Examiner* — Jeffrey Chow
(74) *Attorney, Agent, or Firm* — K&L Gates LLP

(57) ABSTRACT

Map display systems, map data processing apparatuses, map display apparatuses, and map display methods for general navigation systems are provided. A map data processing section categorizes original three-dimensional map data into scene graph data representing a data structure of a three-dimensional map using a tree structure and rendering data for rendering an object included in the three-dimensional map and processes the scene graph data and the rendering data. A map data display section specifies a display area by referring to the scene graph data and reads and displays the rendering data in accordance with the specified display area.

26 Claims, 40 Drawing Sheets

FOREIGN PATENT DOCUMENTS

| | | |
|---|---|---|
| JP | 2002-074403 | 3/2002 |
| JP | 2002-230567 | 8/2002 |
| JP | 2002-279449 | 9/2002 |
| JP | 2004-213662 | 7/2004 |

OTHER PUBLICATIONS

Germs et al., "A multi-view VR interface for 3D GIS," Computers & Graphics, pp. 497-506, 1999.

Varadhan et al., "Out-of-Core Rendering of Massive Geometric Environments," IEEE Visualization, pp. 69-76, 2002.

Brunig et al., "Vehicle Navigation Using 3D Visualization," Intelligent Vehicles Symposium, pp. 474-478, 2003.

Whyte et al., "Visualization and Information: A Building Design Perspective," IEEE Information Visualization, pp. 104-109, 1999.

Whyte et al., "From CAD to virtual reality: modeling approaches, data exchange and interactive 3D building design tools," Automation in Construction, pp. 43-55, 2000.

Office Action Issued by the Japanese Patent Office on Jun. 5, 2007 for corresponding Japanese Application No. 2003-285206.

Brunig, et al. "Vehicle Navigation Using 3D Visualization", on or before Dec. 2003, pp. 474-478.

Varadhan, et al. "Out-of Core Rendering of Massive Geometric Environments", on or before Dec. 2002, pp. 69-76.

Whyte, et al. "Visualization and Information: A Building Design Perspective", on of before Oct. 2001, pp. 104-109.

Mino, et al. "Graphics Technologies for Car Navigation Systems", on or before Oct. 2001, pp. 27-30.

"Matsushita Technical Journal", vol. 47 No. 5, on or before Oct. 2001, pp. 36-45.

Japanese Office Action issued on Jan. 20, 2009, for corresponding Japanese Patent Application JP 2003-285206.

Brunig, M. et al., "Vehicle Navigation Using 3D Visualization", IEEE IV2003 Intelligent Vehicles Symposium Proceed, Institute of Electrical and Electronic Engineers, Jun. 9, 2003 p. 474-478.

Varadhan, G. et al., "Out-of-Core Rendering of Massive Geometric Environments," VIS2002 IEEE Visualization 2002 Proceedings, Institute of Electrical and Electronic Engineers, Oct. 27, 2002 p. 69-76.

Whyte, J. et al., "Visualization and Information: A Building Design Perspective," Proceedings 1999 IEEE International Conferenceon, IEEE Computer Society, Jul. 14, 1999 p. 104-109.

Takashi T. et al., "Control and high speed drawing of the three-dimensional virtual city space based on the hyperspace data structure", Institute of Electronics, Information and Communication Engineers article magazine, Japan, Corporate judicial person Institute of Electronics, Information and Communication Engineers, Aug. 25, 1995 vol. J78-D-II, No. 8, p. 1205-1213.

* cited by examiner

FIG. 11

```
<Area Name ="Northwest Part of Ota-ku">
  <NorthWest Lattitude="N○○:××:△△" Longitude="E○○:××:△△"/>
  <SouthEast Lattitude="N○○:××:△△" Longitude="E○○:××:△△"/>
  <Node File3D="otaku_NW_root">
    <Object Name ="JR Omori Station" POIID="JR_OmoriStation" Tag="1" Bbox="
12,100,5,30,5,40,・・・"/>
    <Object Name ="Omori Police Station" POIID="OmoriPoliceStation" Tag="2" Bbox="
30,45,5,10,7,20,・・・"/>
      ・・・・・・・・・・
    <Node File3D="otaku_NW_01">
      <ObjectName ="Omori Kaizuka"・・・/>
        ・・・・・・
    </Node>
    <Node File3D="otaku_NW_02">
        ・・・・・・
    </Node>
    <Node File3D="otaku_NW_03">
        ・・・・・・
    </Node>
    <Node File3D="otaku_NW_04">
        ・・・・・・
    </Node>
  </Node>
</Area>
```

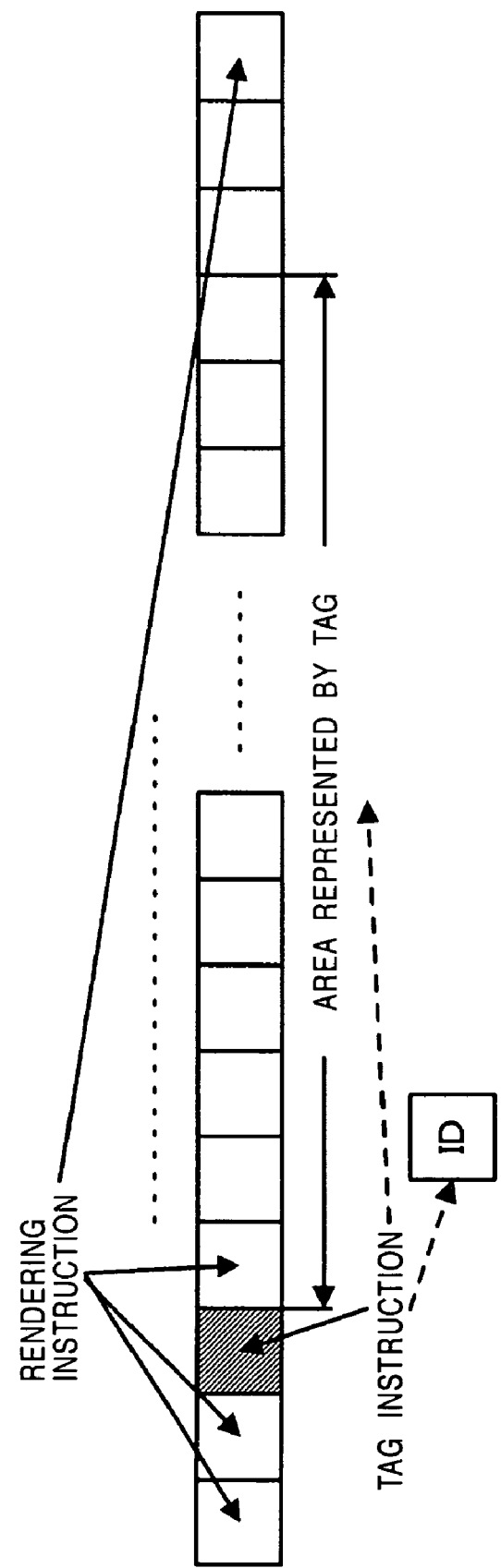

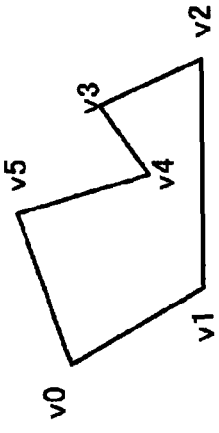
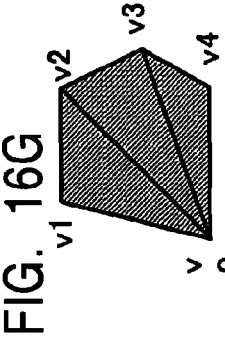
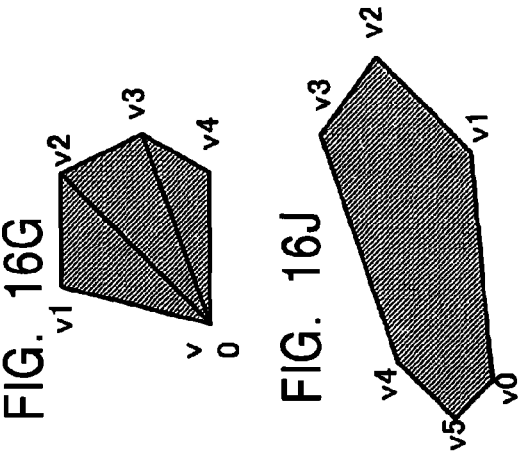
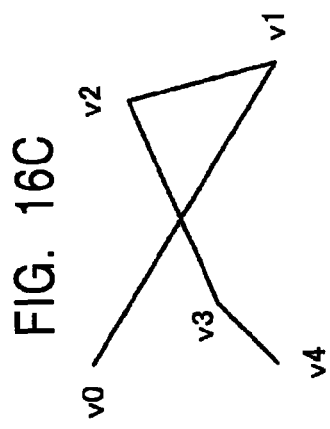
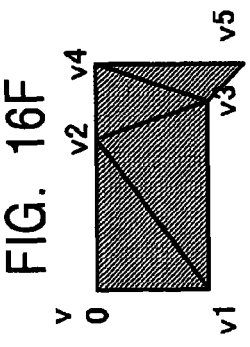
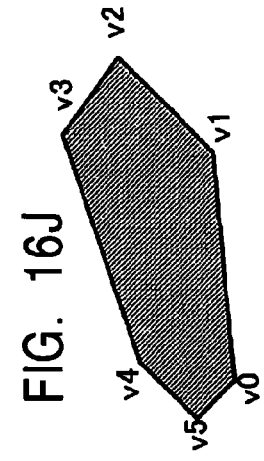
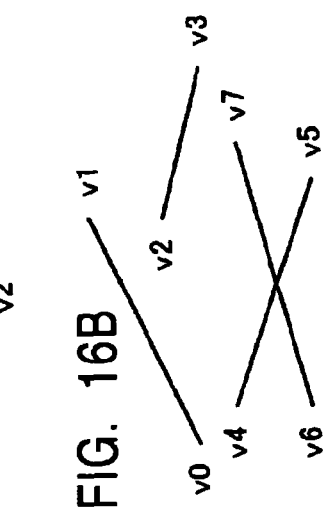
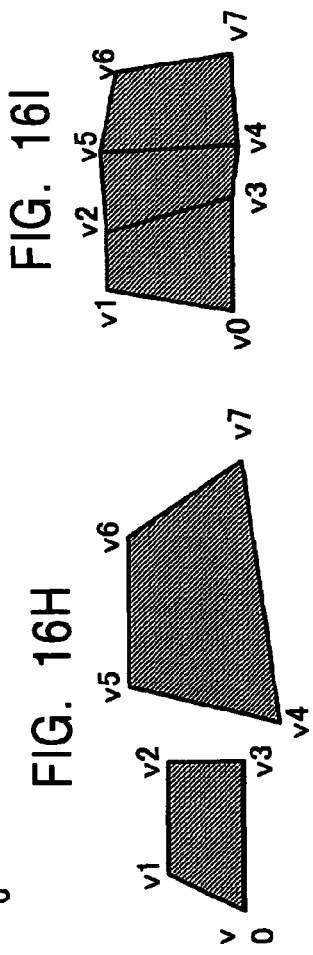

PRIOR ART

PRIOR ART

FIG. 38
NORMAL 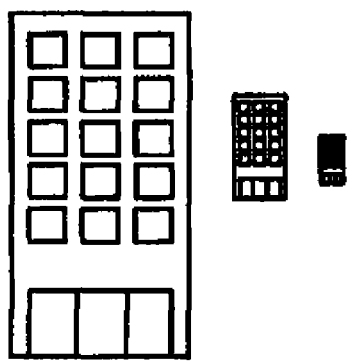   INTRODUCTION OF LOD 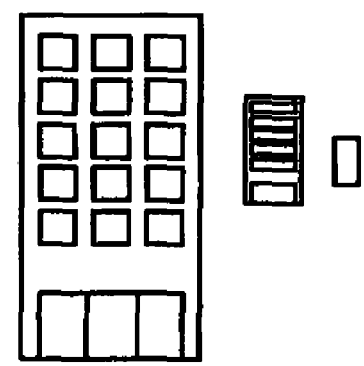
PRIOR ART

PRIOR ART

PRIOR ART

MAP DISPLAY SYSTEM, MAP DATA PROCESSING APPARATUS, MAP DISPLAY APPARATUS, AND MAP DISPLAY METHOD

CROSS REFERENCES TO RELATED APPLICATIONS

This application claims priority to Japanese Patent Application No. P2003-285206 filed on Aug. 1, 2003, the disclosure of which is incorporated by reference herein.

BACKGROUND OF THE INVENTION

The present invention generally relates to map display systems, map data processing apparatuses, map display apparatuses, and map display methods for general navigation systems, such as car navigation systems and pedestrian navigation systems for showing pedestrians routes to their destinations. More particularly, the present invention relates to a map display system, a map data processing apparatus, a map display apparatus, and a map display method having a function to display a three-dimensional map.

In recent years, technologies for displaying three-dimensional maps for car navigation systems have been developed, and three-dimensional maps have become displayable on car navigation screens. Thus, with car navigation systems, users can know, in terms of three dimensions, relationships of the current position and three-dimensional structures, such as surrounding buildings and three-dimensional intersections.

Also, global positioning systems (GPSs) for knowing the current position have been installed or optionally installed on terminals, such as personal digital assistants (PDAs) and cellular telephones. Thus, pedestrian navigation systems for guiding users who carry such terminals to their destinations from the current position have been put into practical use.

Furthermore, three-dimensional graphics rendering engines capable of rendering three-dimensional graphics on the screen of such portable terminals in real time at high speed by hardware have recently been put into practical use, and graphics have been able to be rendered at high speed even with portable terminals.

Hard disks have also been installed on car navigation apparatuses. Also, external mass memories, such as the Memory Stick (Memory Stick is a registered trademark of Sony Corporation), can be installed on portable terminals, such as PDAs. Large volumes of data, such as three-dimensional map data, are stored in such memories, so that the data can be accessed at high speed.

Scene graphs, which are one type of technology for displaying three-dimensional graphics, are used for rendering objects having a complicated structure.

FIGS. 33A and 33B show an example of an object structured using a scene graph. FIG. 33A shows a three-dimensional robot 140 as the object, and FIG. 33B shows parts constituting the object.

FIG. 34 shows an example of the scene graph representing the structure of the object shown in FIG. 33A.

FIG. 35 shows an arrangement of the parts constituting the object represented using the scene graph.

For example, in order to represent the robot 140 shown in FIG. 33A, a part 141 serving as a head or body, a part 142 serving as an arm, and a part 143 serving as a leg are defined in advance, and part IDs, such as "1", "2", and "3", are allocated to the parts 141, 142, and 143, respectively, to be managed, as shown in FIG. 33B. Positional relationships of such parts are described from a root such that each of the parts is converted in terms of scaling, rotation, and translation in that order, as defined in the scene graph in FIG. 34.

Accordingly, for example, a head 141a, a body 141b, a left arm 142a, a right arm 142b, a left leg 143a, and a right leg 143b of the robot are represented, as shown in FIG. 35, and are rendered.

In general, a plurality of formats for describing scene graphs and a plurality of application program interfaces (APIs) for managing the scene graphs are available. A virtual reality modeling language (VRML) and XSI (trademark) files by Softimage Inc. are typical formats. Java 3D (registered trademark) and OpenInventor (trademark) are known as APIs capable of managing the scene graphs.

A data holding method capable of facilitating searching using a k-dimensional tree structure (more specifically, a 6-dimensional tree structure) in a scene graph defining a three-dimensional building is disclosed, for example, in Japanese Unexamined Patent Application Publication No. 10-293862 (FIG. 14).

In contrast, level of detail (LOD) technologies for realizing high-speed rendering without degrading the outline of three-dimensional objects, to be as accurate as possible, have been available.

FIGS. 36 to 38 explain an example of an LOD technology.

For example, as shown in FIG. 36, according to the LOD technology, an object to be rendered is prepared in advance for a plurality of levels of details, such as an object 150 at level 1, an object 151 at level 2, and an object 152 at level 3. For rendering, an object at the most appropriate level of detail is selected in accordance with a distance from a view point (position of a camera 155).

For example, for an object very close to the camera 155, the object 150 at level 1 is rendered. For an object farther away from the camera 155, the object 151 at level 2 is rendered. For an object much farther away from the camera 155, the object 152 at level 3 is rendered. Accordingly, as compared with normal technologies in which complete data must be rendered for any object at any location, rendering of simplified data for an object located far away from a camera and rendering of detailed data for an object located near the camera can be achieved by introduction of the LOD technology, as shown in FIG. 38. Thus, since a load of a graphics rendering engine can be reduced without degrading the outline of a three-dimensional object, the rendering speed can be increased.

In order to avoid frame dropping when three-dimensional data is sent and rendered in real time during communication, a method for avoiding frame dropping in frame rate by categorizing an object depending on the level of detail using an LOD technology and by postponing rendering of a detailed portion is disclosed in Japanese Unexamined Patent Application Publication No. 2002-279449 (Paragraph Nos. 0072 to 0077).

There are many types of LOD technologies, and a quadtree structure is widely used as a technique appropriate for object data having a structure similar to that of a three-dimensional map.

According to this technique, three-dimensional data widely spreading over a particular plane, such as a three-dimensional map, is recorded by being categorized into nodes at a plurality of hierarchical levels depending on the level of detail of the object, and each of the nodes is divided into four nodes at each of the hierarchical levels.

FIGS. 39 to 41 explain a quadtree structure.

In FIG. 39, original data 160 is categorized into nodes at three hierarchical levels, such as level 1 for a node 161 having a large object; level 2 for nodes 162 having a medium-sized object; and level 3 for nodes 163 having a small object, and each of the nodes is divided into four nodes at each of the hierarchical levels. Accordingly, LOD can be realized by performing rendering of each node such that a node at a high level of detail is rendered for an object near a view point and a node at a low level of detail is rendered for an object far away from the view point.

For example, as shown in FIG. 40, if a distance from a camera 170 exceeds a threshold (FAR PLANE) 171, rendering is not performed. If a distance from the camera 170 is between the threshold 171 and a threshold 172, a map of a node only at the lowest level of detail is rendered. If a distance from the camera 170 is between the threshold 172 and a threshold 173, a map of a node at the second-lowest level of detail is rendered. If a distance from the camera 170 is between the threshold 173 and a threshold 174, a map of a node at the third-lowest level of detail is rendered. If a distance from the camera 170 is between the threshold 174 and a threshold (NEAR PLANE) 175, a map of a node at the highest level of detail is rendered. If a distance from the camera 170 is less than the threshold 175, rendering is not performed.

FIG. 41 shows how an LOD quadtree structure is realized. First, assuming that a square 180 that covers the whole data space structured in a two-dimensional wide plane, such as a ground surface, exists, the square 180 is divided into four equally divided surfaces 180a, 180b, 180c, and 180d. Components 181 and 182, which extend over a plurality of divided surfaces, are regarded as widely-extended and huge components. Thus, the components 181 and 182 are stored in a node 190 at a higher hierarchical level. Nodes 191a, 191b, 191c, and 191d corresponding to the respective divided surfaces 180a, 180b, 180c, and 181d are provided as child nodes at a lower hierarchical level, and other components are attributed to the corresponding child nodes.

By repeating such processing as necessary, the map can be hierarchically structured depending on the level of detail.

More specifically, when this method is applied to a three-dimensional map, the map can be automatically hierarchically structured (although an object that is on the boundary for defining hierarchical levels is exceptional), such as a node at the highest hierarchical level for storing mountains, seas, roads, which extend over a wide area; nodes at a lower hierarchical level for storing large structures, such as buildings; and nodes at the lowest hierarchical level for storing houses, signal lights, traffic signs, and the like.

Accordingly, the three-dimensional map can be effectively rendered using an LOD technology.

For various three-dimensional navigation systems, typified by three-dimensional car navigation systems, which have recently become commonplace, three-dimensional maps must be rendered in real time at high speed and with high accuracy. However, representing three-dimensional maps using known scene graphs need enormous volumes of data to be processed, thus making it difficult to perform high-speed processing.

Also, in a known quadtree structure, a high-rise building functioning as a landmark is likely to be categorized into a node for small objects. Thus, a high-rise building located far away from a view point is likely to be omitted even if it is actually viewable. In order to avoid this, processing, such as rendering a node that includes a high-rise building, is needed. However, such processing for determining whether or not a node includes a high-rise building reduces the rendering speed and degrades the significance of data omission.

Also, not only high-speed rendering but displaying point of interest (POI) information appropriate for a landmark, such as a building on a map designated by a user, is also needed.

SUMMARY OF THE INVENTION

The present invention generally relates to map display systems, map data processing apparatuses, map display apparatuses, and map display methods for general navigation systems, such as car navigation systems and pedestrian navigation systems for showing pedestrians routes to their destinations. More particularly, the present invention relates to a map display system, a map data processing apparatus, a map display apparatus, and a map display method having a function to display a three-dimensional map.

In an embodiment, the present invention provides a map display system, a map data processing apparatus, a map display apparatus, and a map display method capable of rendering three-dimensional maps at high speed.

In this regard, a map display system according to an embodiment of the present invention having a function to display a three-dimensional map includes a map data processing section for categorizing three-dimensional map data into scene graph data representing a data structure of the three-dimensional map using a tree structure and rendering data for rendering an object included in the three-dimensional map and for processing the scene graph data and the rendering data; and a map data display section for specifying a display area by referring to the scene graph data and for reading and displaying the rendering data in accordance with the specified display area.

With this arrangement, the map data processing section categorizes three-dimensional data into scene graph data representing a data structure of a three-dimensional map using a tree structure and rendering data for rendering an object included in the three-dimensional map and processes the scene graph data and the rendering data. The map data display section specifies a display area by referring to the scene graph data and reads and displays the rendering data in accordance with the specified display area. Thus, three-dimensional maps can be rendered at high speed.

Also, a map data processing apparatus according to an embodiment of the present invention for processing three-dimensional map data includes a memory unit for storing the three-dimensional map data; and a map data processing unit for categorizing the three-dimensional map data into scene graph data representing a data structure of a three-dimensional map using a tree structure and rendering data for rendering an object included in the three-dimensional map and for processing the scene graph data and the rendering data.

With this arrangement, the map data processing unit categorizes three-dimensional map data stored in the memory unit into scene graph data representing a data structure of a three-dimensional map using a tree structure and rendering data for rendering an object included in the three-dimensional map and processes the scene graph data and the rendering data.

Also, a map display apparatus according to an embodiment of the present invention having a function to display a three-dimensional map includes a scene graph data memory unit for storing scene graph data representing a data structure of the three-dimensional map using a tree structure; a rendering data memory unit for storing rendering data for rendering an object included in the three-dimensional map; a display area specifying unit for specifying a display area by referring to the scene graph data; a data reading unit for reading the rendering data in accordance with the specified display area; and a display processing unit for performing display processing on the basis of the read rendering data.

With this arrangement, the display area specifying unit specifies a display area by referring to scene graph data stored in the scene graph data memory unit. The data reading unit reads rendering data in accordance with the specified display area. The display processing unit performs display processing on the basis of the read rendering data.

Also, a map display method according to the present invention for displaying a three-dimensional map, the map display method includes the steps of setting a view point and a sight line in the three-dimensional map; searching scene graph data representing a data structure of the three-dimensional map using a tree structure having nodes at a plurality of hierarchical levels depending on the level of detail and determining whether or not the three-dimensional map represented by each of the nodes is displayed on the basis of the view point and the sight line in accordance with a distance from the view point to a ground surface of the three-dimensional map represented by each of the nodes; reading rendering data for rendering an object included in the three-dimensional map of each of the nodes when the three-dimensional map represented by each of the nodes is displayed; and performing display processing on the basis of the read rendering data.

With this arrangement, a view point and a sight line in a three-dimensional map to be displayed are set, and it is determined whether or not a three-dimensional map represented by each of nodes is displayed on the basis of the view point and the sight line in accordance with a distance from the view point to a ground surface of the three-dimensional map represented by each of the nodes by searching the scene graph data. When the three-dimensional map represented by each of the nodes is displayed, rendering data for rendering an object included in the three-dimensional map represented by each of the node is read, and display processing is performed on the basis of the read rendering data.

According to an embodiment of the present invention, a tree structure is represented by nodes at a plurality of hierarchical levels depending on the level of detail of a map, and an object higher than a predetermined threshold is displayed in a node at a lower level of detail. Thus, non-display of an object functioning as a landmark can be avoided.

Also, by searching scene graph data for an object designated by a user on a three-dimensional map displayed on a screen, point of interest information on the searched object is read. Thus, proper point of interest information can be displayed on the screen.

Accordingly, the present invention in an embodiment is applicable to navigation systems, such as car navigation systems and pedestrian navigation systems for showing pedestrians routes to their destinations.

Additional features and advantages of the present invention are described in, and will be apparent from, the following Detailed Description of the Invention and the figures.

BRIEF DESCRIPTION OF THE FIGURES

FIG. 11 shows an example of an XML format used in the scene graph data.

FIG. 15 illustrates the details of a run-time information segment.

FIGS. 16A to 16J show examples of primitives.

FIGS. 36 to 38 illustrate an LOD technology.

DETAILED DESCRIPTION OF THE INVENTION

The present invention generally relates to map display systems, map data processing apparatuses, map display apparatuses, and map display methods for general navigation systems, such as car navigation systems and pedestrian navigation systems for showing pedestrians routes to their destinations. More particularly, the present invention relates to a map display system, a map data processing apparatus, a map display apparatus, and a map display method having a function to display a three-dimensional map.

Embodiments of the present invention will be described with reference to the drawings.

Figure 1:
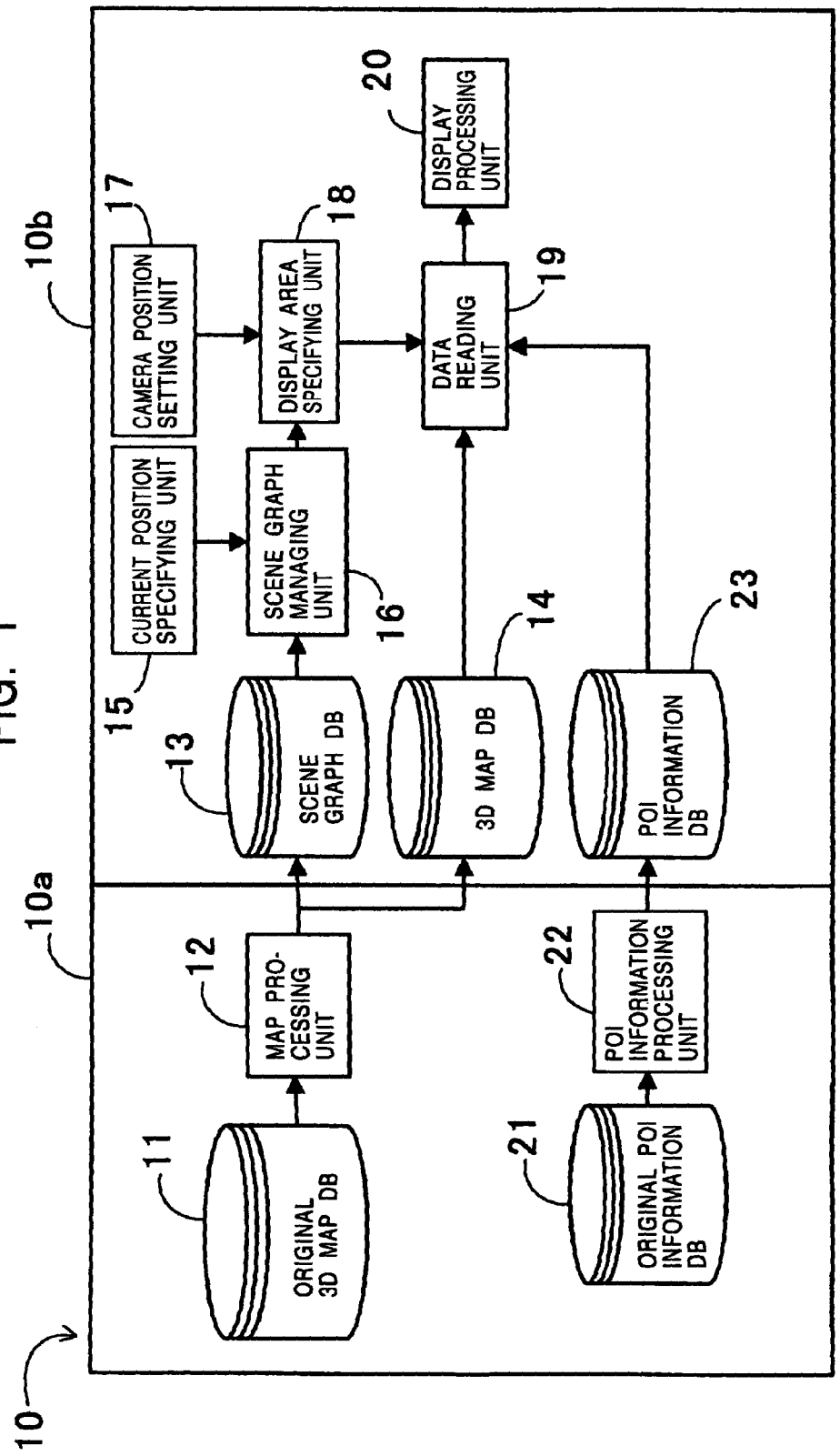
FIG. 1 is a functional block diagram showing functions of a map display system according to an embodiment of the present invention.

FIG. 1 is a functional block diagram showing functions of a map display system 10 according to an embodiment of the present invention.

The map display system 10 includes a map data processing section 10a for processing original map data supplied from map-making companies or the like and original, POI information, which includes information on particular POIs in a map, supplied from map-making companies or various information providing companies; and a map data display section 10b for performing display processing on the basis of the processed information.

The map data processing section 10a includes an original three-dimensional map database 11 for storing original three-dimensional map data; a map processing unit 12 for categorizing, an original three-dimensional map into scene graph data representing the structure of the original three-dimensional map using a tree structure and rendering data for rendering an object included in the three-dimensional map and for processing the scene graph data and the rendering data; an original POI information database 21 for storing original POI information; and a POI information processing unit 22 for processing the original POI information.

Also, the map data display section 10b includes a scene graph database 13 for storing the scene graph data categorized by the map processing unit 12; a three-dimensional map database 14 for storing the rendering data necessary for rendering the three-dimensional map; a current position specifying unit 15 for specifying the current position; a scene graph managing unit 16 for managing the scene graph data; a camera position setting unit 17 for setting a view point and a sight line in the three-dimensional map; a display area specifying unit 18 for specifying a display area by referring to the scene graph data on the basis of the view point and sight line data in a three-dimensional space for rendering; a data reading unit 19 for reading the rendering data in accordance with the specified display area from the three-dimensional map database 14; a display processing unit 20 for performing display processing on the basis of the read rendering data; and a POI information database 23 for storing the POI information processed in the POI information processing unit 22.

Figure 2:
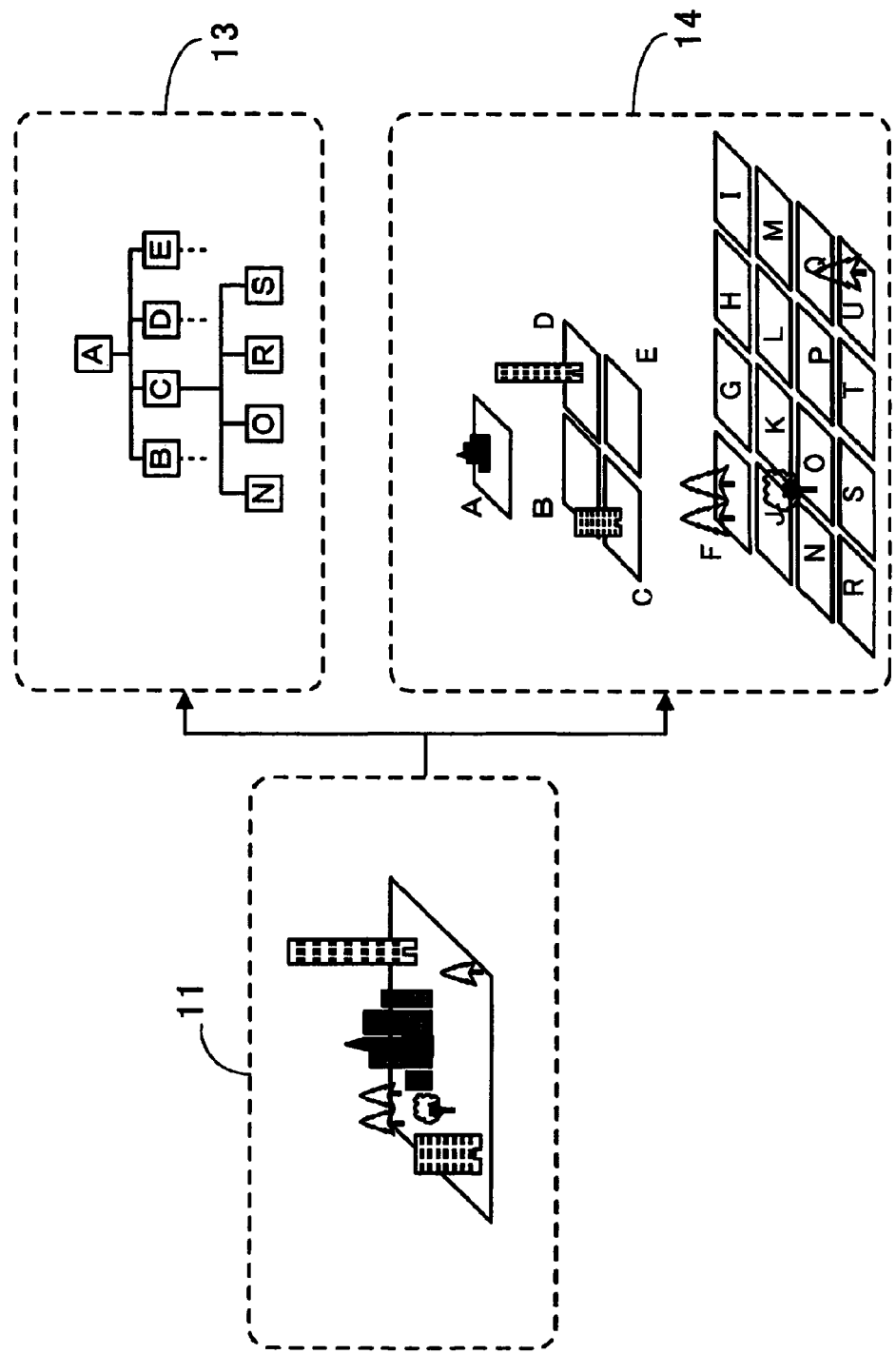
FIG. 2 shows an example of the structure of data categorized by a map processing section.

FIG. 2 shows an example of the structure of the data categorized by the map processing unit 12.

In the scene graph data stored in the scene graph database 13, the data structure of the entire wide-area map in the original three-dimensional map database 11 is described using a tree structure. Although general scene graph data can manage various tree structures, the scene graph data used here is specialized in functions for maps. Thus, the data structure can be simplified, and the processing speed can be increased.

The tree structure used here has nodes at a plurality of hierarchical levels depending on the level of detail of the three-dimensional map. A node at the highest hierarchical level is displayed for the lowest level of detail. The lower the hierarchical level of a node is, the higher the level of detail is displayed.

As shown in FIG. 2, the structure of the scene graph data in this embodiment is specialized in a quadtree structure. In other words, a wide-area three-dimensional map is described using a structure in which each of the nodes is divided into four nodes at each hierarchical level.

Describing such a tree structure using an extensible markup language (XML) facilitates editing and browsing.

In contrast, rendering data for rendering buildings and terrains (hereinafter, referred to as objects) included in three-dimensional maps is written in a sequential execution data format, in particular, using binary data corresponding, in a one-to-one relationship, to a rendering instruction of a three-dimensional rendering API necessary for rendering three-dimensional maps, instead of using generally-used structural data, such as material geometry. Accordingly, a reduction in time spent for converting data into a rendering instruction increases the rendering speed, and description using binary data reduces the data size.

The rendering data is associated with areas of a map divided using a quadtree structure, which will be described below, and a plurality of pieces of rendering data is recorded in the three-dimensional map database 14.

The operation of the map display system 10 shown in FIG. 1 will now be described.

In the map data processing section 10a, original three-dimensional map data is captured from the original three-dimensional map database 11. The map processing unit 12 categorizes the original three-dimensional map data into scene graph data and rendering data, and the scene graph data and the rendering data are stored in the scene graph database 13 and the three-dimensional map database 14, respectively. Also, original POI information is captured from the original POI information database 21. The POI information processing unit 22 processes the original POI information to be stored in the POI information database 23.

Then, in the map data display section 10b, the current position specifying unit 15 specifies the current position on the map. Based on this information, the scene graph managing unit 16 reads the structure of the scene graph data from the scene graph database 13.

The scene graph managing unit 16 sends information on the read structure of the scene graph data to the display area specifying unit 18. The display area specifying unit 18 acquires the view point and sight line data in the three-dimensional space for rendering from the camera position setting unit 17, and specifies a display area by referring to the scene graph data in accordance with the specified current position and the view point and sight line data. Here, if the scene graph data is structured using the quadtree, as shown in FIG. 2, a display area is specified by considering the position of a camera and a position of each of the nodes in the scene graph data in the space (the details of specifying a display area will be explained below). The data reading unit 19 reads the rendering data in accordance with the specified display area from the three-dimensional map database 14, and the display processing unit 20 performs displaying processing for rendering on the screen.

Also, if a user requires presentation of information on a POI, such as a particular building displayed on the screen, POI information appropriate for the object designated by the user is sent from the POI information database 23 to the data reading unit 19 and is displayed together with the map.

A map display apparatus according to this embodiment of the present invention will be described by assuming a navigation system described below.

Figure 3:
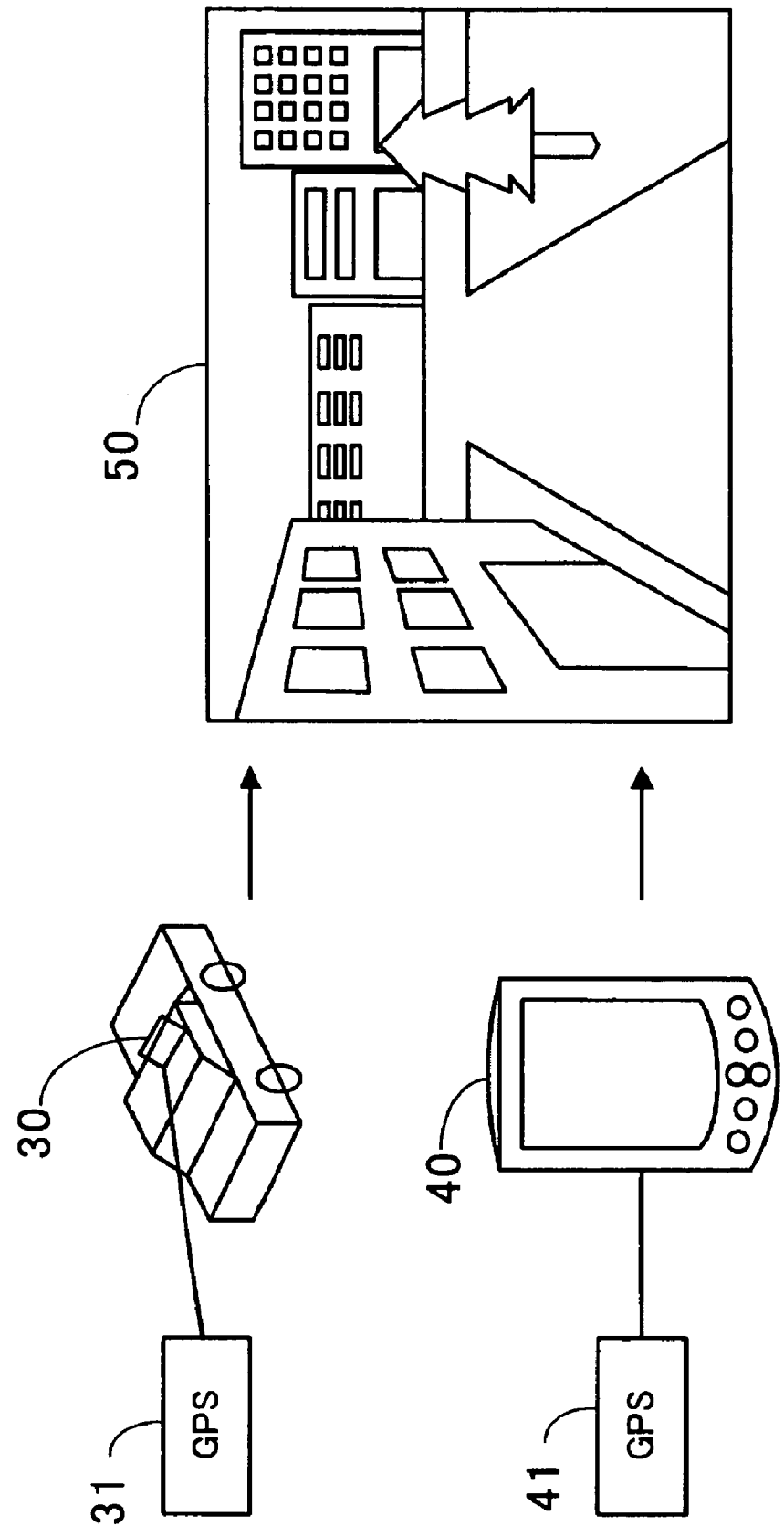
FIG. 3 schematically shows the structure of a navigation system according to an embodiment of the present invention.

FIG. 3 schematically shows the structure of the navigation system according to this embodiment of the present invention.

Such a navigation system has the combination of a car navigation apparatus 30 and a global positioning system (GPS) 31 or the combination of a portable terminal 40, such as a personal digital assistance (PDA) or a cellular telephone, installed with a pedestrian navigation apparatus and a GPS 41. In such a navigation system, a bird's-eye view three-dimensional map centered on the current position shown in FIG. 3 is displayed on a screen 50 of a display device, such as a cathode ray tube (CRT), a liquid crystal display and the like.

Such a navigation system may be used for displaying townscapes centering on the current position and for displaying moving pictures for simulating moving of a course in order to navigate a user from a designated starting point to a destination on the basis of the position indicated by the GPS 31 or 41.

Figure 4:
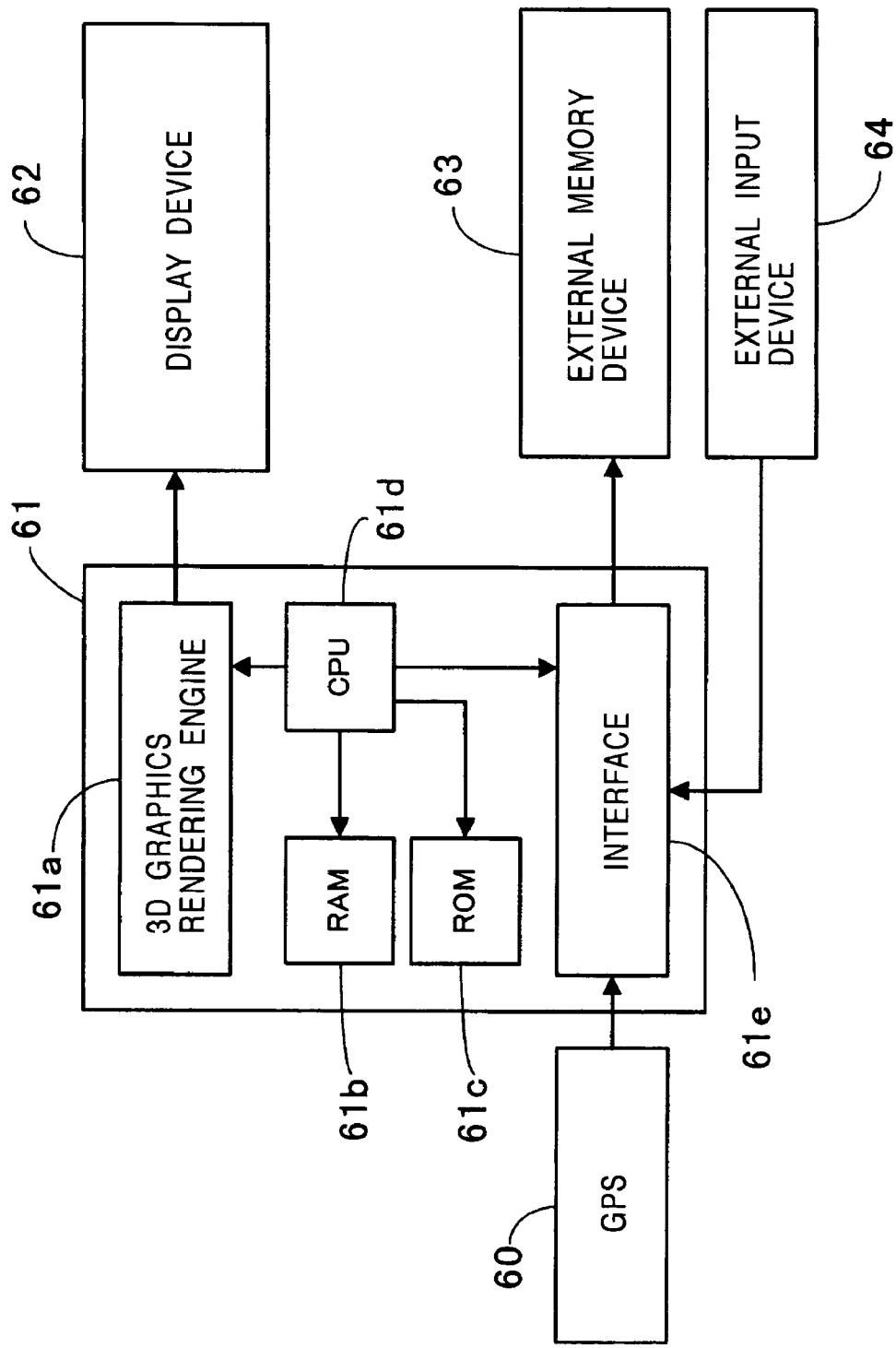
FIG. 4 shows an example of the hardware structure of the navigation system according to an embodiment of the present invention.

FIG. 4 shows an example of the hardware structure of the navigation system according to this embodiment of the present invention.

The navigation system includes a GPS 60, an information processing device 61, a display device 62, an external memory device 63, and an external input device 64. The information processing device 61 includes a 3D graphics rendering engine 61a, a random-access memory (RAM) 61b, a read-only memory (ROM) 61c, a central processing unit (CPU) 61d, and an interface 61e for the external devices.

The GPS 60 is used for knowing the current position.

The 3D graphics rendering engine 61a is hardware capable of displaying various types of text and graphics, such as three-dimensional graphics, on the display device 62 in accordance with instructions from the CPU 61d.

The RAM 61b temporarily stores a program being executed and data being calculated by the CPU 61d.

The ROM 61c stores a basic program and data executed by the CPU 61d.

A three-dimensional graphics API, such as Open-GL (registered trademark), which sends a rendering instruction to the 3D graphics rendering engine 61a and is necessary for realizing rendering of three-dimensional graphics, is stored in the RAM 61b or the ROM 61c.

The CPU 61d controls each unit of the information processing device 61 in accordance with the program stored in the RAM 61b or the ROM 61c.

The interface 61e controls inputting and outputting of information among the GPS 60, the external memory device 63, the external input device 64, and the CPU 61d.

The display device 62 is, for example, a CRT, a liquid crystal display and the like. The display device 62 displays video signals processed by the 3D graphics rendering engine 61a on the screen.

The external memory device 63 is, for example, a compact disc read-only memory (CD-ROM), a digital versatile disk (DVD), a hard disk drive (HDD), a Memory Stick (registered trademark), and the like. Various types of information, such as maps, are stored in the external memory device 63.

The external input device 64 is, for example, a remote controller for car navigation apparatuses, a touch panel for a screen of PDAs, or various buttons. The external input device 64 sends to the CPU 61d information necessary for a user to control the navigation system.

The operation of such a navigation system will now be schematically explained.

When the CPU 61d executes a navigation program recorded in the RAM 61b or the ROM 61c, map information for a corresponding area is read from the external memory device 63 via the interface 61e for the external devices in accordance with information acquired from the GPS 60 or the external input device 64, and is written into the RAM 61b. When the CPU 61d executes a map rendering program, a map rendering instruction is issued to a three-dimensional graphics API in accordance with the information. Then, in accordance with the instruction, a rendering signal is sent to the 3D graphics rendering engine 61a, and the map is displayed on the display device 62.

In the navigation system shown in FIG. 4, the map information recorded in the external memory device 63 corresponds to the scene graph database 13, the three-dimensional map database 14, and the POI information database 23 shown in FIG. 1. Also, the current position specifying unit 15, the scene graph managing unit 16, the camera position setting unit 17, the display area specifying unit 18, the data reading unit 19, and the display processing unit 20 shown in FIG. 1 are recorded in the RAM 61b and the ROM 61c shown in FIG. 4 as an instruction group carried out by the CPU 61d.

The map data processing section 10a shown in FIG. 1 is, for example, a personal computer (PC) and includes a memory device for recording the original three-dimensional map database 11 and the original POI information database 21, although this is not illustrated. Also, for example, the map data processing section 10a includes a CPU. Under the control of the CPU, the map data processing section 10a categorizes the original three-dimensional data into scene graph data and rendering data and processes the scene graph data and the rendering data.

The scene graph data and the three-dimensional map rendering data categorized and processed by the map data processing section 10a will now be described.

Figure 5:
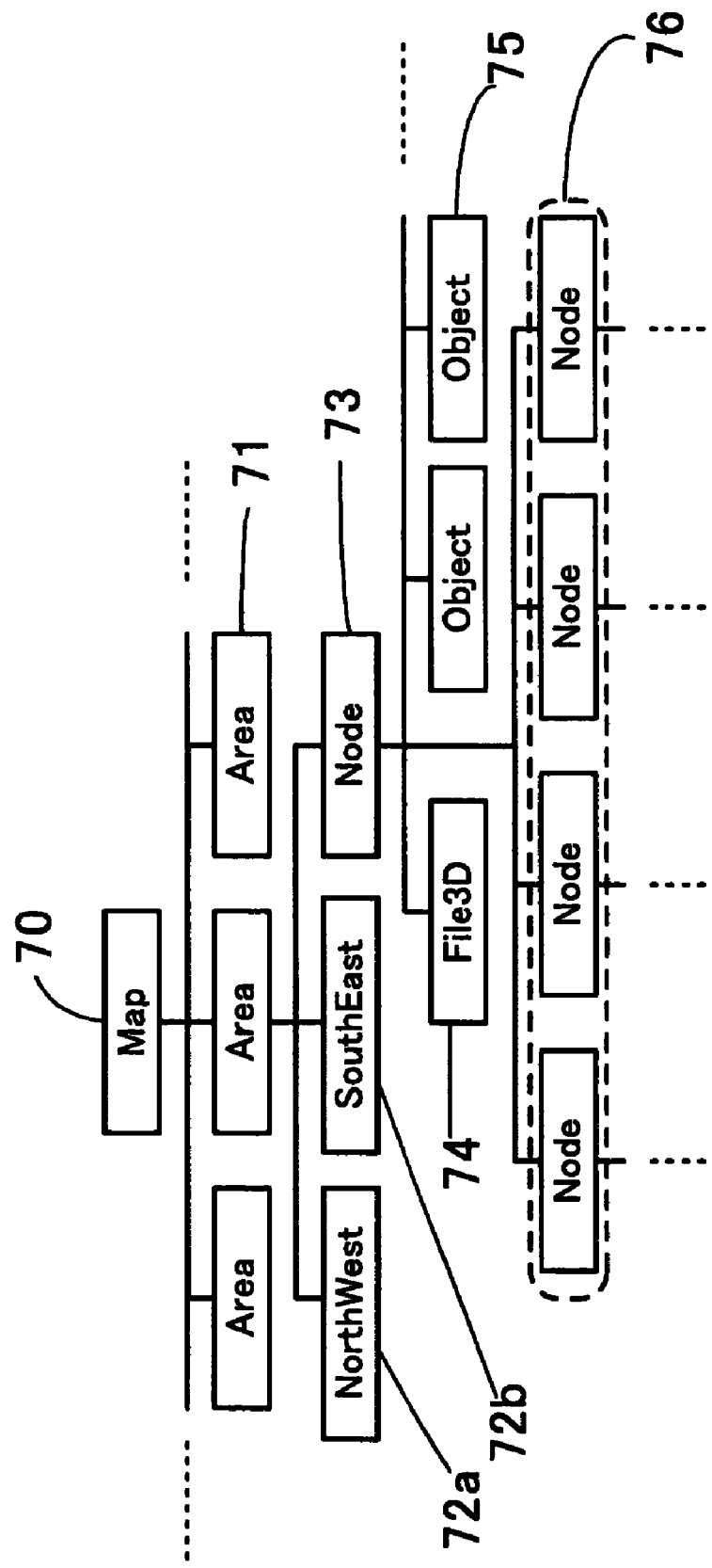
FIG. 5 shows a structure of scene graph data.

FIG. 5 shows an example of the structure of the scene graph data.

Here, the scene graph data is specialized in a quadtree structure.

In the scene graph data, an entire map 70 is divided into a plurality of areas 71. Each of the areas 71 is defined using latitude and longitude. In the example shown in FIG. 5, one of the areas 71 is described as a region designated by latitude and longitude of a northwest edge represented by a northwest latitude and longitude 72a and by latitude and longitude of a southeast edge represented by a southeast latitude and longitude 72b. The structure of the map representing the region is described using a tree of a node 73 having a quadtree structure. The structure such that the node 73 has four child nodes 76 is repeated up to a set number of quadtree hierarchical levels. Hereinafter, the hierarchical levels of the node tree will be represented by the term "level". The level of the node 73, which is a root, is defined as level 1, the level of each of the four child nodes 76 is defined as level 2, the level of each of the child nodes of each of the child nodes 76 is defined as level 3, and so on.

In addition to the child nodes 76, components constituting the node 73 are a file name (File3D) 74 of three-dimensional map data of the node 73 and a plurality of objects 75, such as a building and a road existing on the map.

Figure 6:
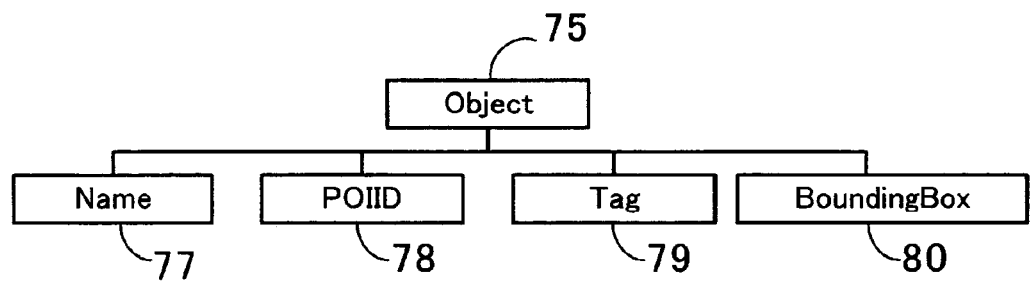
FIG. 6 shows an example of the data structure of an object.

FIG. 6 shows an example of the data structure of one of the objects 75.

The one of the objects 75 includes an object name 77, a POIID 78, which is an ID of the one of the objects 75 as a POI, a tag 79 indicating the one of objects 75, and bounding box information 80 on the one of the objects 75.

Figure 7:
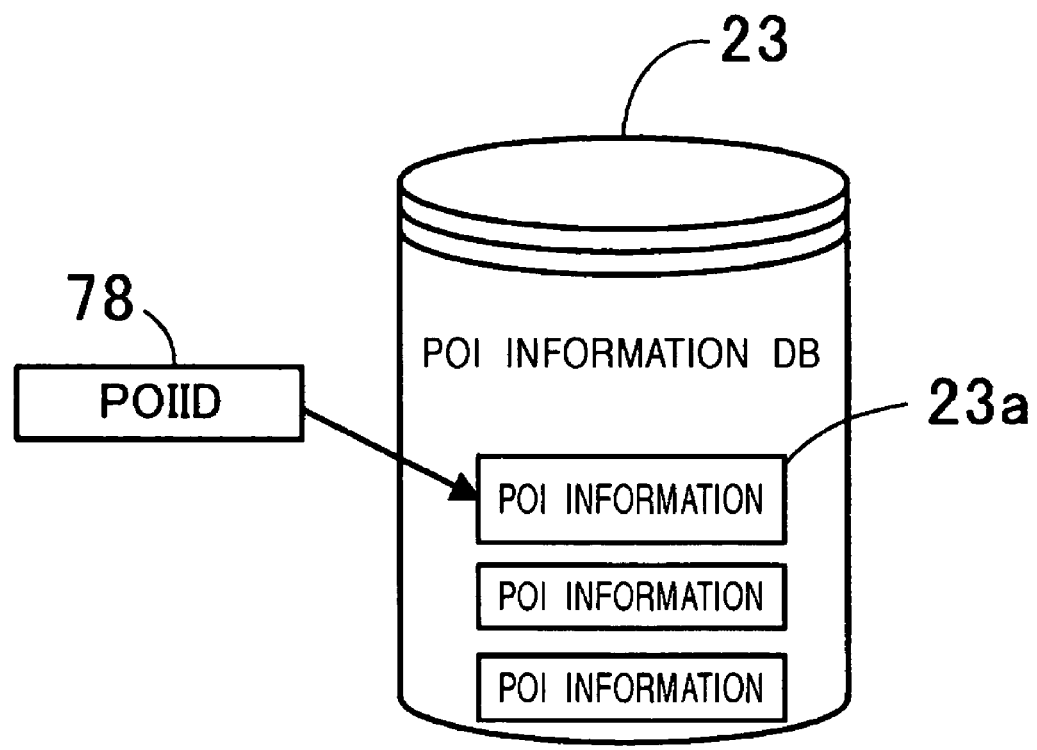
FIG. 7 illustrates a POIID of the object.

FIG. 7 explains the POIID 78 of the one of the objects 75.

The POIID 78 indicates an ID of POI information 23a in the POI information database 23. For example, if the one of the objects 75 indicates Tokyo Tower, the POIID 78 indicates the POI information 23a on Tokyo Tower in the POI information database 23.

Figure 8:
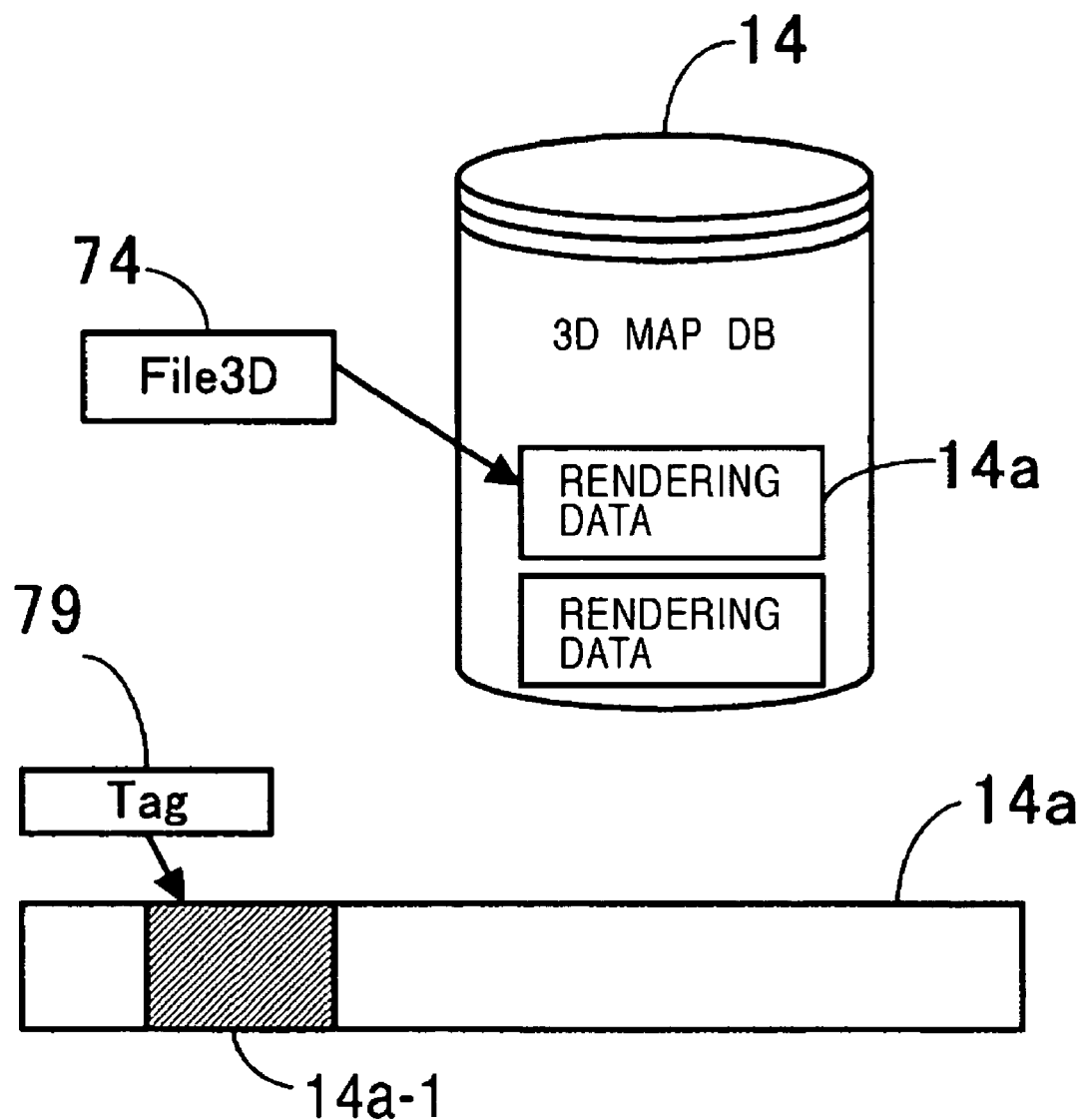
FIG. 8 illustrates a tag of the object.

FIG. 8 explains the tag 79 of the one of the objects 75.

The tag 79 indicates an ID of a tag recorded in a part of the rendering data for the three-dimensional map corresponding to the one of the areas 71 in which data on the one of the objects 75 is described. For example, if the rendering data for the three-dimensional map corresponding to the one of the areas 71 shown in FIG. 5 is rendering data 14a for the three-dimensional map designated by the file name 74 stored in the three-dimensional map database 14, as shown in FIG. 8, an ID of a tag described in advance in a rendering area 14a-1 in the rendering data 14a corresponding to the data on the one of the objects 75 is designated by the tag 79 in the scene graph data.

Figure 9:
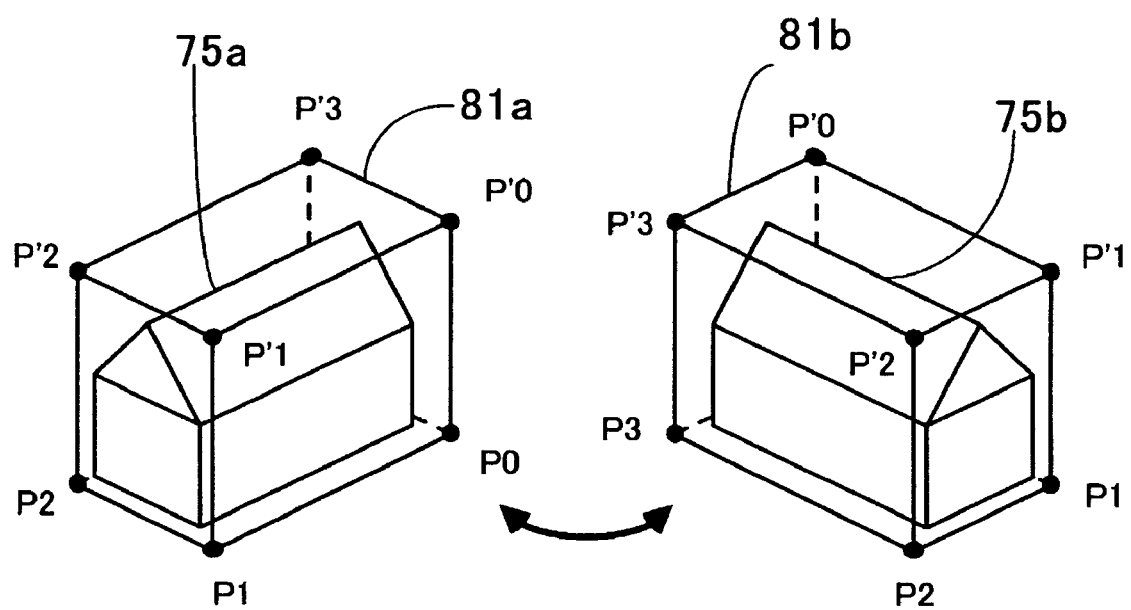
FIG. 9 illustrates bounding box information of objects.

FIG. 9 explains the bounding box information 80 of objects 75a and 75b.

The bounding box information 80 includes coordinates 81a and 81b of cubes covering areas in which the objects 75a and 75b exist, respectively, as shown in FIG. 9. The coordinates 81a and 81b are data for knowing the positional relationship in a space between the objects 75a and 75b.

In accordance with the details described above, the scene graph data can be written in an XML format as shown below.

Figure 10:
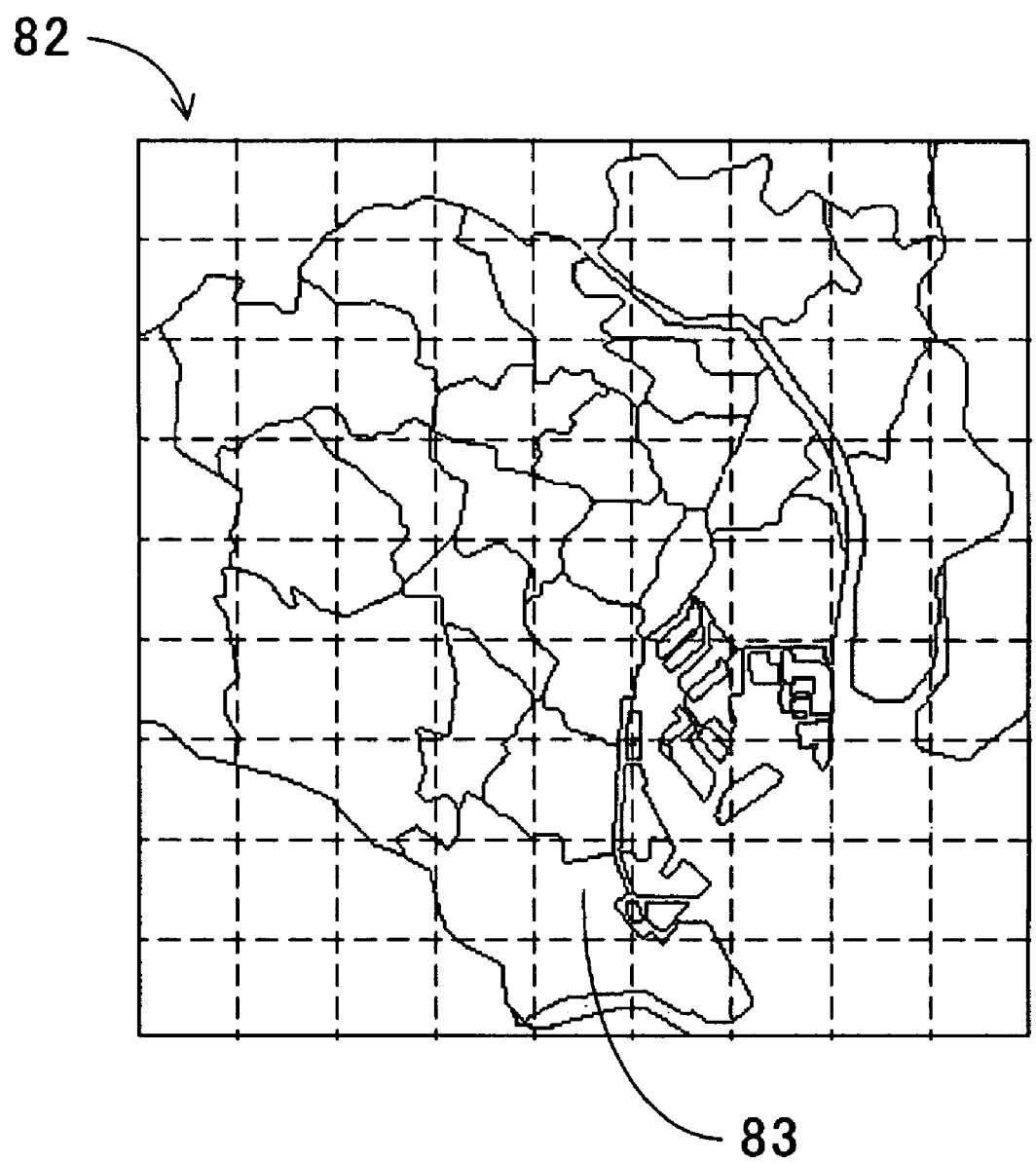
FIG. 10 shows a map to be described using the scene graph data.

FIG. 10 shows a map to be described using the scene graph data.

FIG. 11 shows an example of the scene graph data written in the XML format.

In FIG. 10, a map 82 representing Greater Tokyo Area is divided into a plurality of map areas 83. The plurality of map areas 83 corresponds to the plurality of areas 71 divided from the map 70 shown in FIG. 5. For example, one of the map areas 83 that indicates a northwest part of Ota-ku is written in the XML format, as shown in FIG. 11.

The description shown in FIG. 11 will now be explained in association with the scene graph data shown in FIG. 5. "Northwest Part of Ota-ku" is described as one of the areas 71. Then, latitude and longitude is designated as the northwest latitude and longitude 72a and the southeast latitude and longitude 72b. Then, "otaku-NW-root" is described as the file name 74 in which rendering data on the corresponding three-dimensional map is described. Then, the plurality of objects 75 is designated.

The data structure of each of the objects 75 is arranged as shown in FIG. 6. In the example shown in FIG. 11, "JR Omori Station", "Omori Police Station", and the like, are described as the names 77. The POIID 78, the tag 79, and the bounding box information 80 are described for each of the objects 75. For example, for one of the objects 75 that has a description "JR Omori Station" as the name 77, a description "<Object Name=" JR Omori Station"POIID="JR_OmoriStation"Tag="1"Bbox="12,100, 5,30,5,40, . . . "/>" is provided. The above description means that rendering data for "JR Omori Station" is recorded in a part of "otaku_NW_root" in which tag 1 is provided.

Each of the areas 71 is divided into four areas in accordance with the four child nodes 76 shown in FIG. 5. A file name and plurality of objects are described for each of the areas, as described above. In the example shown in FIG. 11, "otaku_NW_01", "otaku_NW_02", "otaku_NW_03", and "otaku_NW_04" are described as file names. Accordingly, locations of three-dimensional rendering data of the child nodes 76 are controlled.

The structure of the rendering data for the three-dimensional map will now be described with reference to FIG. 12.

The rendering data is written in a binary format, for example, under the control of the CPU in the map data processing section 10a. The content of the rendering data is broadly categorized into a map information segment 84, a loading information segment 85, and a run-time information segment 86.

Each of the segments constituting the rendering data will now be described.

Figure 13:
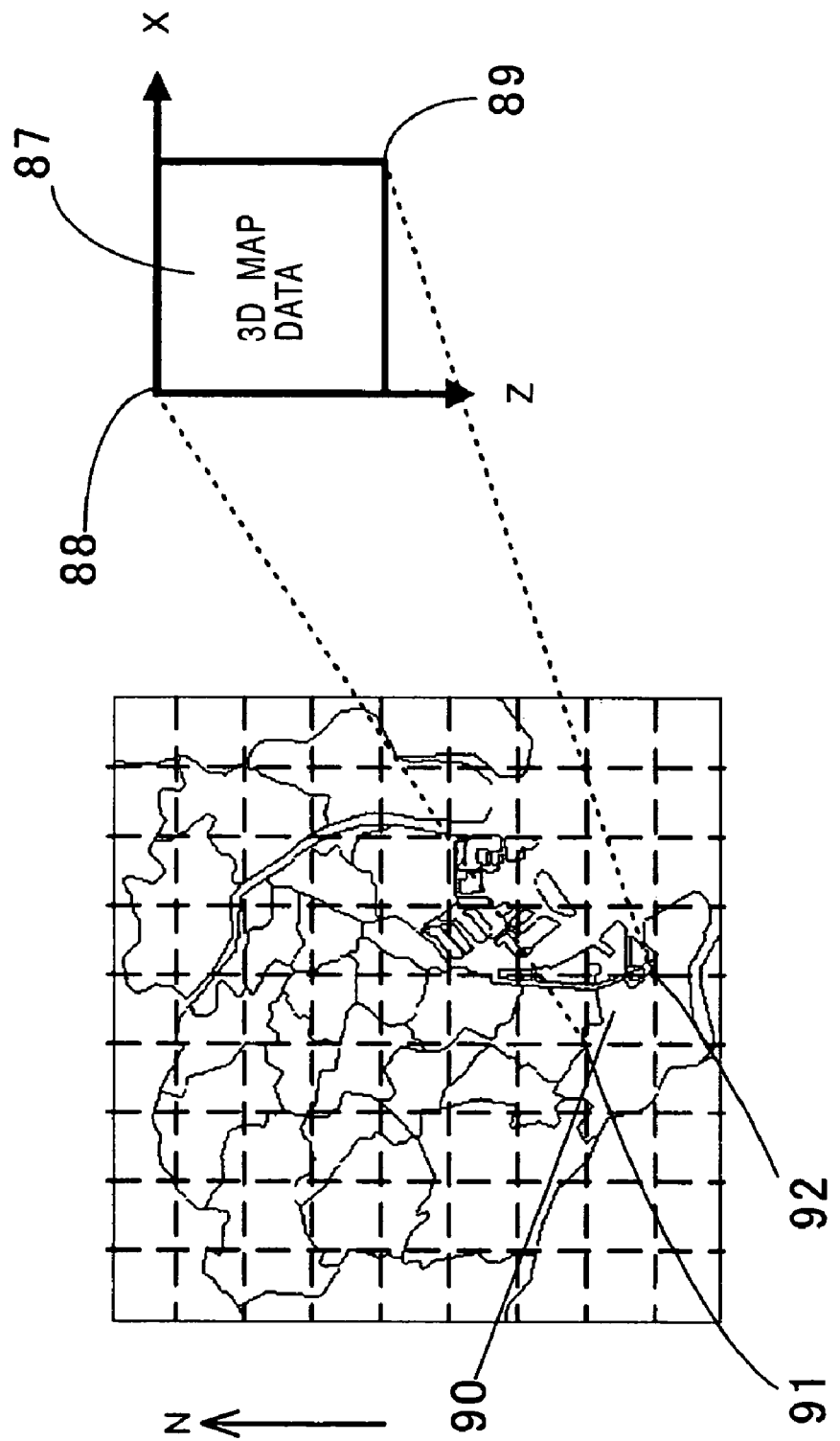
FIG. 13 illustrates the details of a map information segment.

FIG. 13 explains the details of the map information segment 84.

The map information segment 84 includes scaling information in a three-dimensional space by a right-handed coordinate system in which three-dimensional graphics are rendered and in a real space realized by a map represented by latitude and longitude. More specifically, by using a general three-dimensional right-handed coordinate system defined by X-, Y-, and Z-axes, a ground surface is represented on an XZ-plane 87. The map information segment 84 includes coordinates of an upper left endpoint 88 and a lower right endpoint 89 of the rendering data for the three-dimensional map developed in the map area in the space. The map information segment 84 also includes latitude and longitude of coordinates 91 and 92 of a northwest endpoint and a southeast endpoint, respectively, of a corresponding real area 90. For rendering, scaling is performed in accordance with such information.

Figure 14:
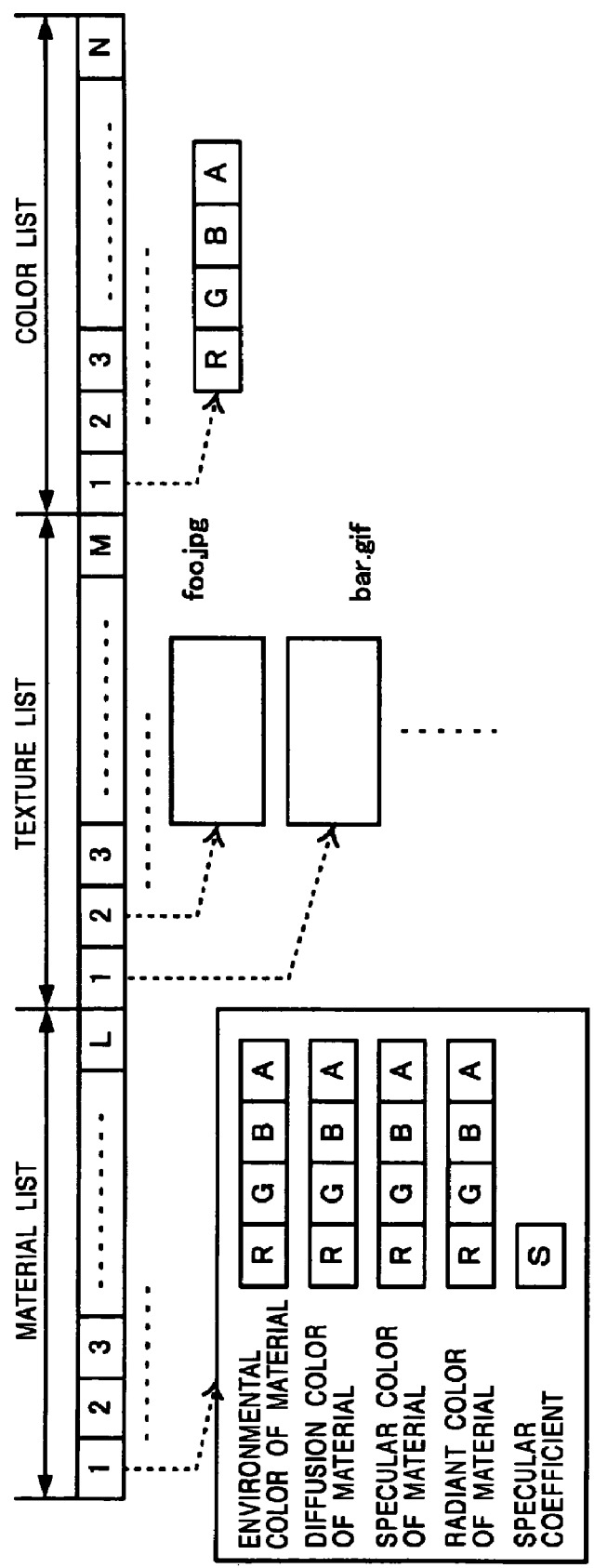
FIG. 14 illustrates the details of a loading information segment.
Figure 17A:
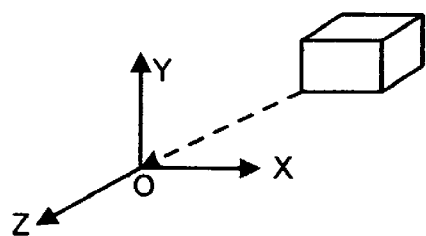
FIGS. 17A to 17D explain a matrix transformation instruction group.
Figure 17B:
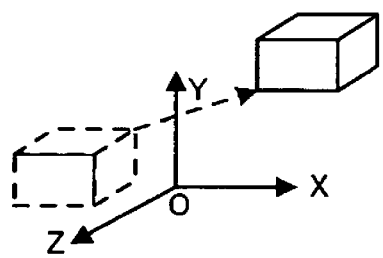
Figure 17C:
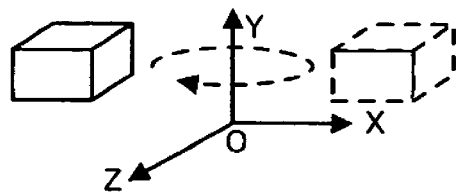
Figure 17D:
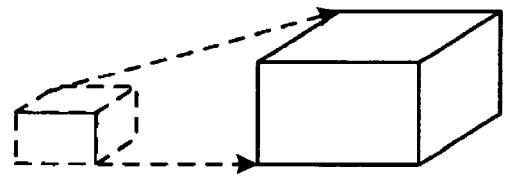

FIG. 14 explains the details of the loading information segment 85.

The loading information segment 85 includes information list of material, texture, and color for representing appearance of an object. A plurality of materials, textures, and colors are defined here, and they are numbered in the defined order up to the defined numbers.

In the material list, an environmental color, a diffusion color, a specular color, and a radiant color representing appearance of the material is designated using an RGB or RGBA format. The material list also includes a specular coefficient representing reflection of light. A plurality of colors can be defined in the material list.

The texture list includes images to be attached to a three-dimensional object, such as a wall surface of a building. Real texture is recorded in the three-dimensional map database 14 shown in FIG. 1 as image data recorded using an original or known image format, such as a joint photographic coding experts group (JPEG) format or a graphics interchange format (GIF). The texture list includes file names of the images.

The color list includes colors of the object written in the RGB or RGBA format.

FIG. 15 explains the details of the run-time information segment 86.

Figure 12:
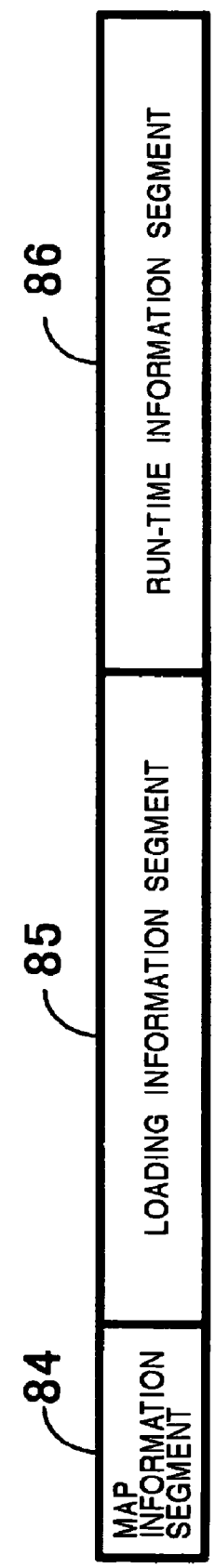
FIG. 12 shows the structure of rendering data for a three-dimensional map.

The run-time information segment 86 shown in FIG. 12 includes a rendering instruction for rendering a three-dimensional map and a tag instruction for providing an ID in an area in which the rendering instruction is provided. The tag instruction is used for designating a rendering area for objects embedded in a map, such as a particular building and road in the map. The tag instruction also designates an ID and an area of the tag. A plurality of tag instructions can be embedded in the segment. The ID of the tag corresponds to a tag of an object whose ID is designated in the scene graph data.

Rendering instructions are broadly categorized into a rendering starting instruction, a matrix transformation instruction group, a matrix push and pop instruction, a material designating instruction, a texture designating instruction, a color designating instruction, a normal designating instruction, a texture vertex designating instruction, a vertex rendering instruction, and a rendering termination declaration instruction. These instructions correspond to basic rendering instructions of a general three-dimensional graphics library, such as Open-GL.

Each of the rendering instructions mentioned above will now be described.

The rendering starting instruction declares starting of rendering of three-dimensional graphics and declares the type of a primitive used.

FIGS. 16A to 16J show examples of primitives.

The term "primitive" indicates a type of a polygon to be rendered. Primitives are designated by vertices v0, v1, V2, and so on, as shown by a point in FIG. 16A, a line in FIG. 16B, a line strip in FIG. 16C, a line loop in FIG. 16D, a triangle in FIG. 16E, a triangle strip in FIG. 16F, a triangle fan in FIG. 16G, a quadrangle in FIG. 16H, a quadrangle strip in FIG. 16I, and a polygon (N-sided polygon) in FIG. 16J.

The rendering starting instruction corresponds to a glBegin( ) instruction of Open-GL. Also, the rendering termination declaration instruction corresponds to glEnd( ) of Open- GL. In accordance with the vertex rendering instruction provided between the rendering starting instruction and the rendering termination declaration instruction, a polygon is rendered in a three-dimensional space.

FIGS. 17A to 17D explain the matrix transformation instruction group.

The matrix transformation instruction group is provided for matrix processing in a three-dimensional space, such as moving to the origin, translation, rotation, and scaling of an object rendered in a space, as shown in FIGS. 17A to 17D, respectively. When such instructions are carried out, parameters for the current object, such as a position in which the object is to be rendered, a rotation angle with respect to an axis, and a scaling factor, are set. Also, these instructions may be combined.

The instructions for moving to the origin, translation, rotation, and scaling correspond to a glLoadIdentity( ) instruction, a glTranslate( ) instruction, a glRotate( ) instruction, and a glScale( ) instruction, respectively, of Open-GL.

The matrix push and pop instruction is used for storing or recovering a parameter for a matrix transformation instruction for the current object. The matrix push and pop instruction corresponds to a glPushMatrix( ) instruction and a glPopMatrix( ) instruction of Open-GL. By combining them, a scene graph structure on a tree can be rendered.

The material designating instruction, the texture designating instruction, and the color designating instruction designate IDs of the material, texture, and color designated by the loading information as the current appearance, texture, and color of the object.

The normal designating instruction, the texture vertex designating instruction, and the vertex rendering instruction designate normals for calculating for writing, coordinates of texture vertices, and vertices of a designated primitive in a space, respectively, between the rendering starting instruction and the rendering termination declaration instruction.

Figure 18:
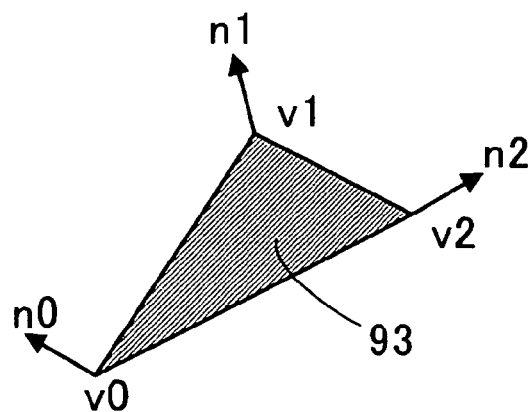
FIG. 18 illustrates a normal designating instruction.

FIG. 18 explains the normal designating instruction.

Normals n0, n1, and n2 are designated for a surface 93 to be rendered and vertices v0, v1, and v2.

Figure 19:
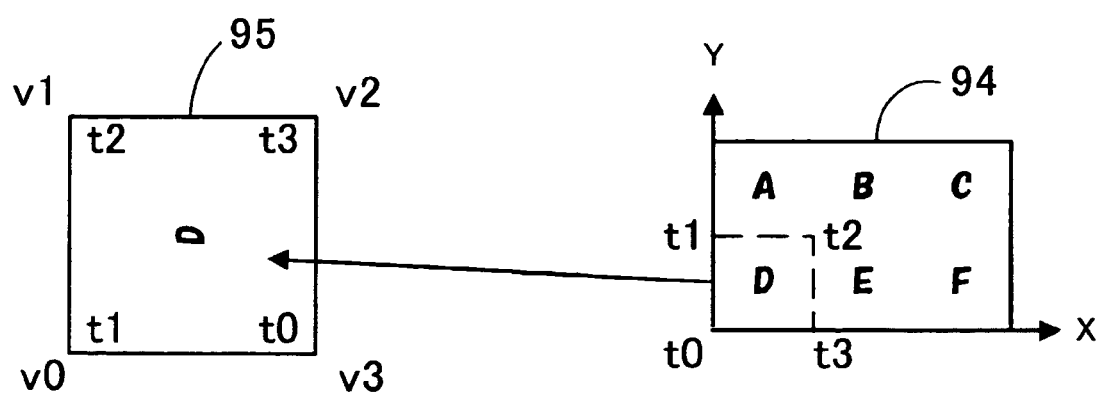
FIG. 19 illustrates texture and texture coordinates.

FIG. 19 explains texture and texture coordinates.

In the texture vertex designating instruction, coordinates t0, t1, t2, and t3 of a part to be attached to a surface 95 is designated from a texture image 94 designated in advance by the loading information segment 85 in accordance with the current image designated in advance by the texture designating instruction, and an instruction to attach the image is given.

Similarly, the current color designated by the color designating instruction is designated for the designated vertexes and the surface.

Also, the vertex rendering instruction designates vertex coordinates of the current primitive.

Such rendering instructions written in a binary format will be described.

Figure 20:
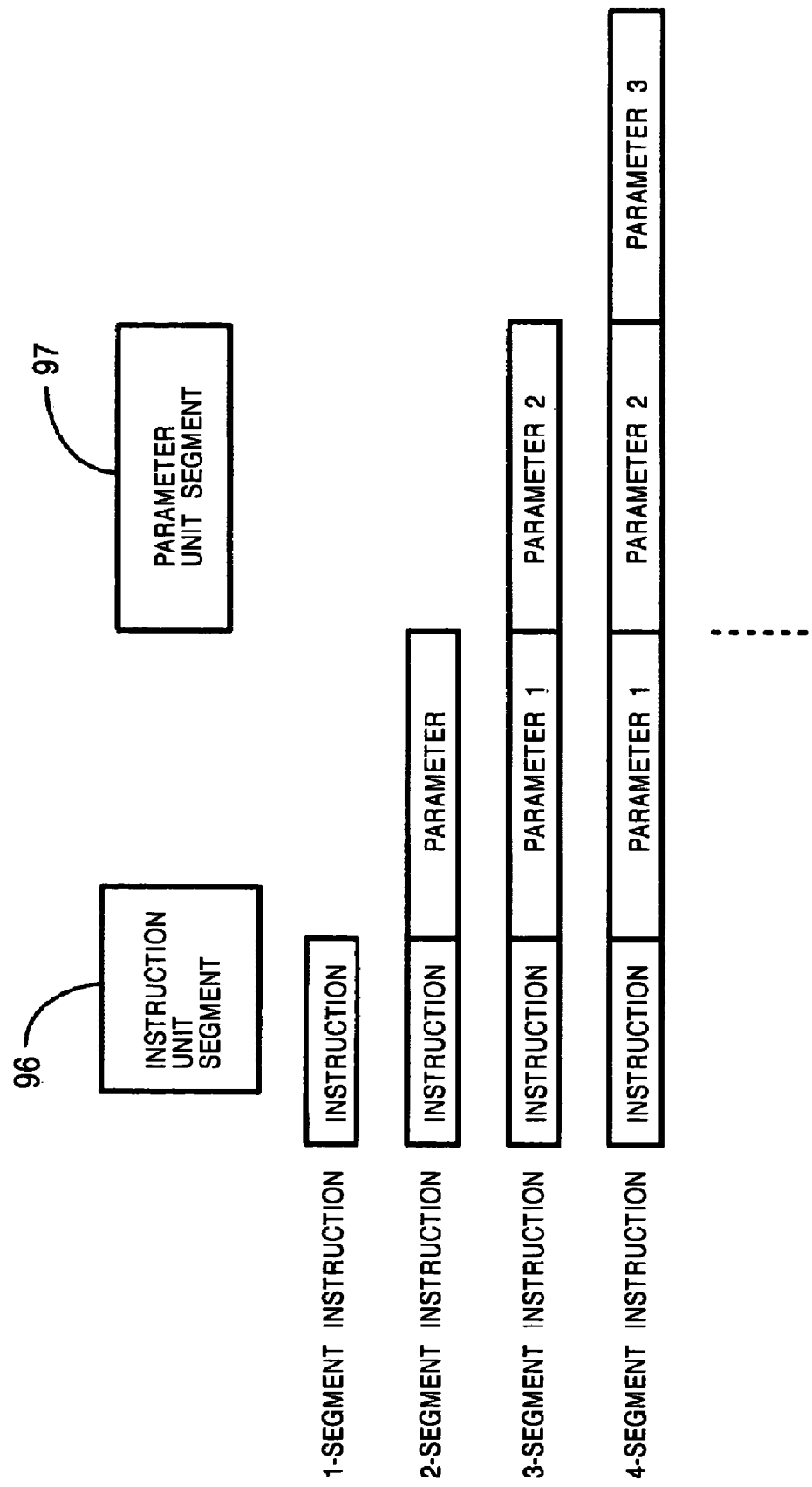
FIG. 20 shows examples of rendering instructions written in a binary format.

FIG. 20 shows examples of the rendering instructions written in the binary format.

The basic length of each of the instructions has a fixed number of bytes depending on the basic segment length. For example, if a segment length is 2 bytes, a unit of a basic segment (instruction unit segment) 96 defining an instruction is 2 bytes. Also, in order to represent various parameters necessary for an instruction, a parameter unit segment 97 is defined, in addition to the instruction unit segment 96. The instruction unit segment 96 and the parameter unit segment 97 are arranged separately because, unlike a rendering instruction whose type is limited, data having 4 bytes or more is generally necessary for representing real numbers, such as space coordinates.

The rendering instructions are categorized into 1-segment instructions and two-or more-segment instructions depending on the characteristics, as shown in FIG. 20. The two-or more-segment instructions have a structure having an instruction unit segment and two or more parameter segments.

For example, the rendering termination declaration instruction, which does not need any parameter, is a 1-segment instruction. The rendering starting instruction having a parameter for a type of a primitive and the material designating instruction, the texture designating instruction, and the color designating instruction having parameters for indices for material, texture, and color, respectively, set by the loading information segment 85 are 2-segment instructions.

Also, the texture vertex designating instruction having two parameters, such as coordinates (two dimensional XY coordinates) of a texture image, and the tag instruction, although this is not a rendering instruction, having parameters for an ID and the length of the tag are 3-segment instructions. Also, the vertex designating instruction having three parameters, such as three-dimensional space coordinates, is a 4-segment instruction. The number of parameters is determined in accordance with the type and necessity of the instruction.

The original POI information is also processed such that an ID corresponding to the POIID 78 associated with each of the objects 75 is added, as shown in FIG. 6.

As described above, the scene graph data, the rendering data, the POI information, and the like processed by the map data processing section 10a are supplied to the navigation system shown in FIG. 4 and are recorded in the external memory device 63. The data processed by the map data processing section 10a may be recorded on CD-ROMs or DVDs to be supplied. Alternatively, the data may be supplied via a network, such as the Internet.

Although texture images may be displayed on the navigation system by sequentially downloading in real time so as not to cause frame dropping, it is preferable that data be recorded in the external memory device 63 of the navigation system before use, in terms of a processing speed and the like.

As described above, in this embodiment, since data processing for reducing the calculation amount is performed in advance for the information processing device 61 having the CPU 61d, whose processing speed is slow, used in the navigation system shown in FIG. 4, a processing load of the navigation system can be reduced.

The details of processing performed by the navigation system shown in FIG. 4 will now be described.

Figure 21:
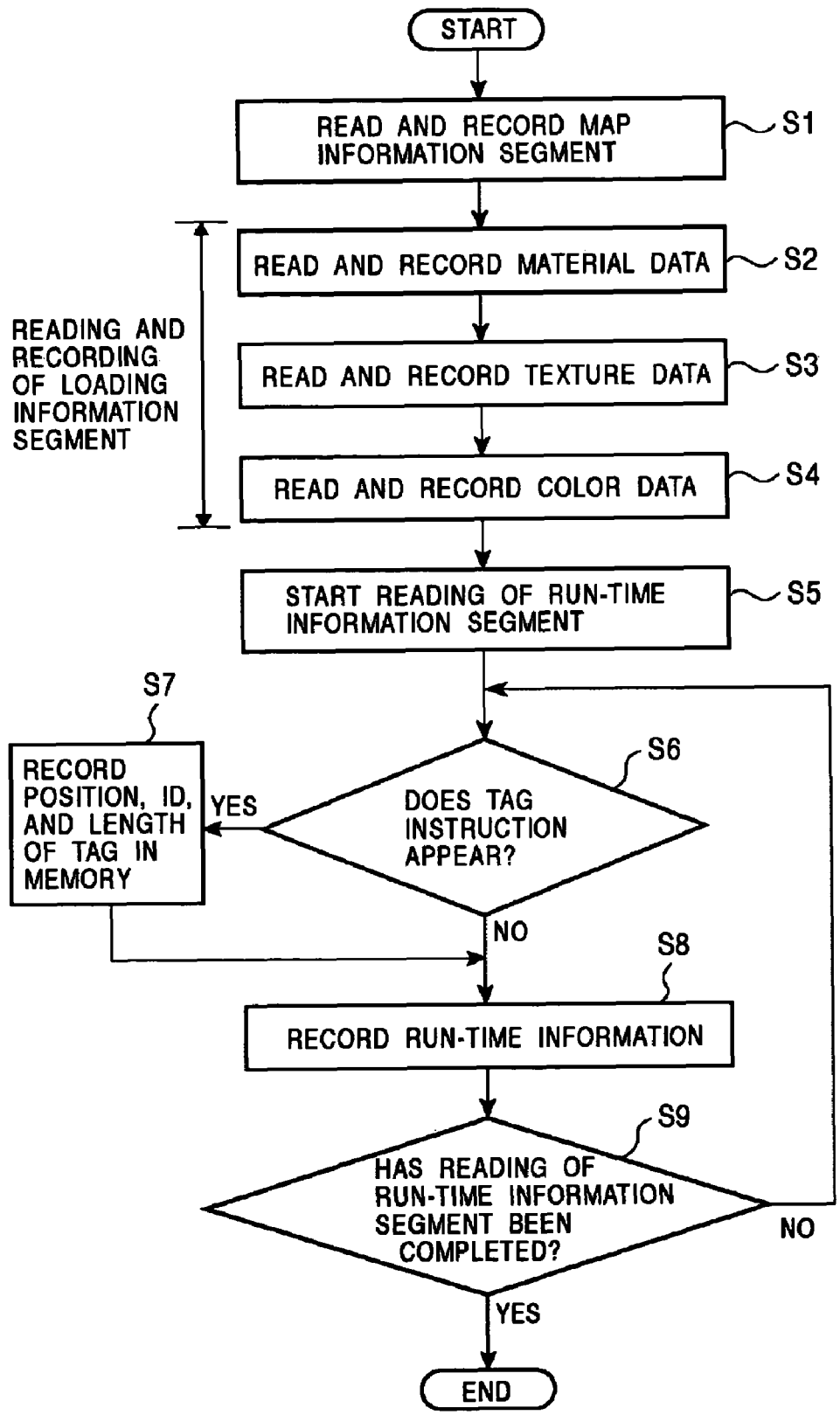
FIG. 21 is a flowchart for explaining a process for reading the rendering data for the three-dimensional map.

A process for reading rendering data for a three-dimensional map will now be described with reference to a flowchart shown in FIG. 21.

The entire processing using the scene graph data will be described later.

When the process for reading the rendering data for the three-dimensional map starts, the map information segment 84 is read from the rendering data described in the three-dimensional map database 14 recorded in the external memory device 63 via the interface 61e under the control of the CPU 61d, and an area for which the map is to be rendered is acquired and is recorded in the RAM 61b (step S1).

Then, reading and recording of the loading information segment 85 is performed. Here, under the control of the CPU 61d, the material data shown in FIG. 14 is read and recorded in the RAM 61b (step S2), a file name of necessary texture is read from the texture data and is loaded to be recorded in the RAM 61b (step S3). Then, the color data is read and is recorded in the RAM 61b (step S4).

The run-time information segment 86 is read (step S5), and it is determined whether or not a tag instruction appears (step S6). If a tag instruction appears, the position, ID, and length of the tag are recorded in the RAM 61*b* (step S7) and the process proceeds to step S8. If no tag appears, the read run-time information is recorded in the RAM. 61*b* (step S8). The CPU 61*d* determines whether or not reading of the entire run-time information segment 86 has been completed (step S9). The processing steps from step S6 are repeated until the entire run-time information segment 86 has been read. When the entire run-time information segment 86 has been read, the process for reading the rendering data for the three-dimensional map terminates.

Figure 22:
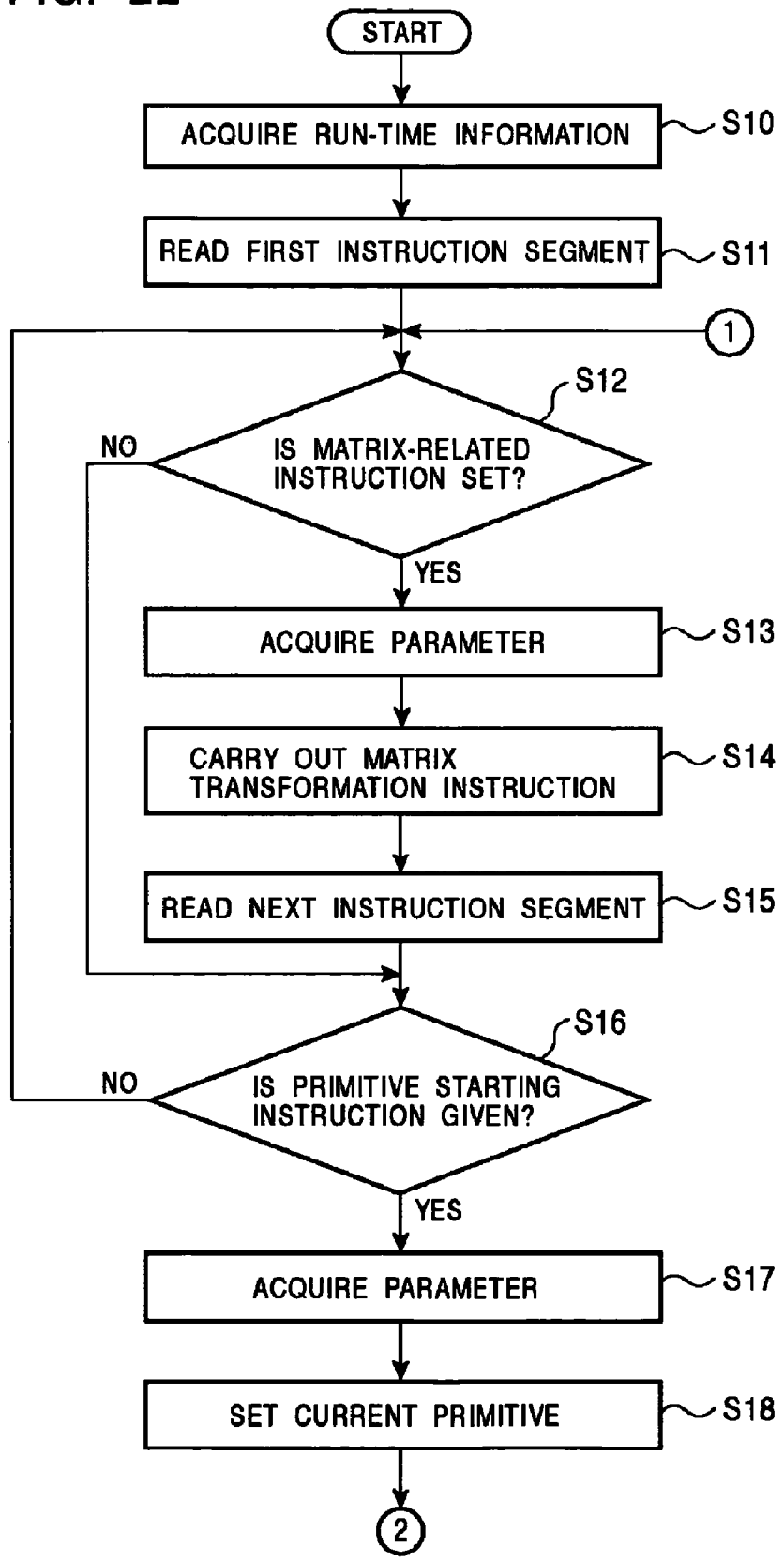
FIGS. 22 and 23 are flowcharts for explaining a process for rendering a normal three-dimensional map.
Figure 23:
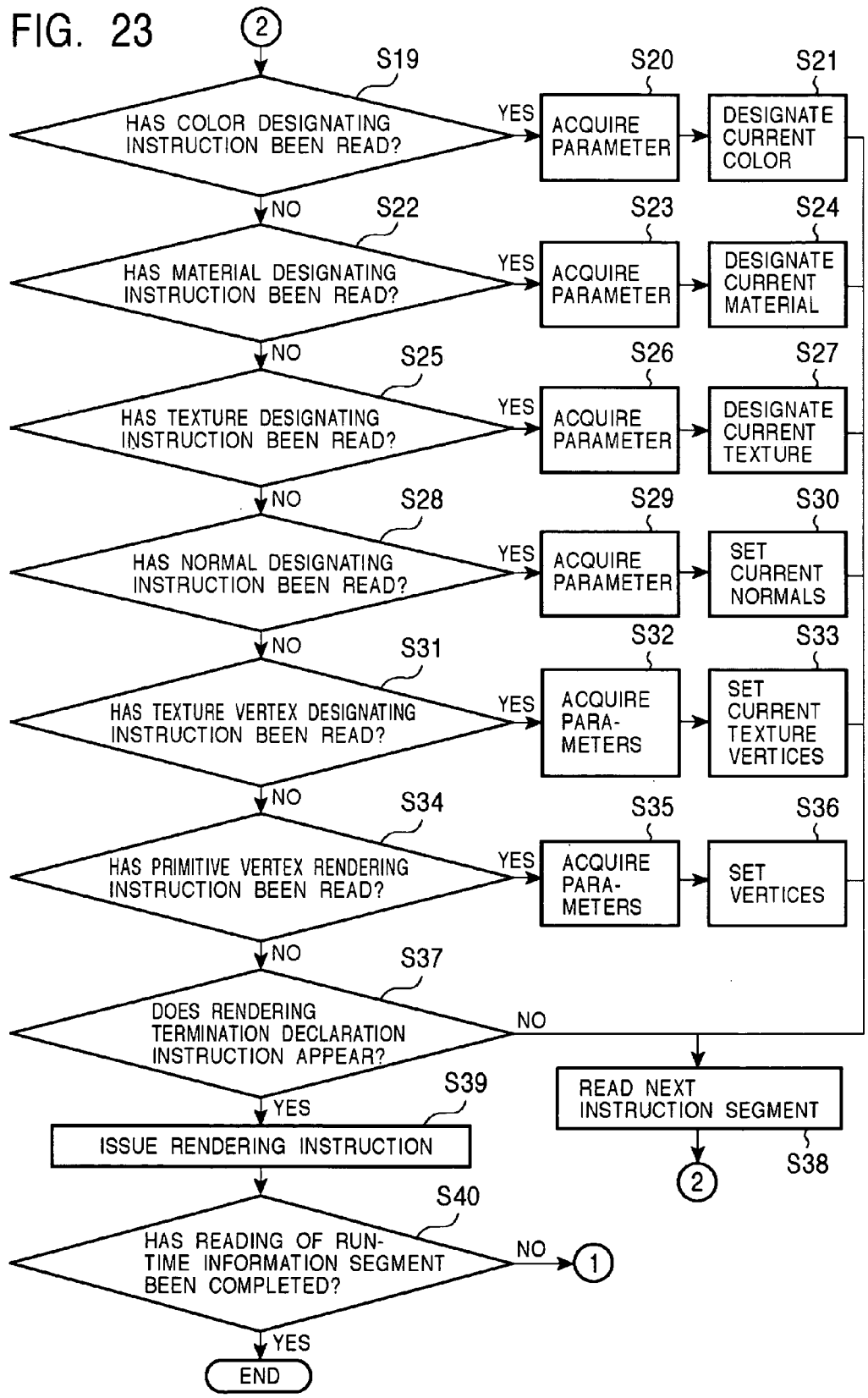

A process for rendering a normal three-dimensional map will now be described with reference to flowcharts shown in FIGS. 22 and 23.

When the process for rendering the three-dimensional map starts, a first address of the run-time information segment 86 in the RAM 61*b* is accessed. Run-time information is acquired (step S10), and a first rendering instruction segment is read (step S11). Then, it is determined whether or not a matrix-related instruction, such as a matrix transformation instruction or a push and pop instruction, is set (step S12). If a matrix-related instruction is set, a parameter is acquired when necessary (step S13), and the instruction is carried out (step S14). The next instruction segment is read (step S15), and the process proceeds to step S16. Accordingly, the current location, scaling, rotation, and the like of primitives to be rendered are defined in advance. If the matrix-related instruction is not set, the process proceeds to step S16.

In step S16, it is determined whether or not a primitive starting instruction is given. If the primitive starting instruction is given, a parameter representing a type of a designated primitive is acquired (step S17), and is set as the current primitive (step S18). Then, the process proceeds to step S19 in FIG. 23. If the primitive starting instruction is not given, the process returns to step S12.

After setting the current primitive in step S18, vertices to be designated function as vertices of designated primitives until the rendering termination declaration instruction is issued. For example, if the type of a primitive is a triangle, as shown in FIG. 16E, vertices to be designated function as vertices of the triangle in the designated order.

Determination of whether or not a color designating instruction, a material designating instruction, a texture designating instruction have been read is performed in steps S19, S22, and S25, respectively. If the color designating instruction, the material designating instruction, and the texture designating instruction have been read, parameters representing respective IDs are acquired in step S20, S23, and S26, respectively. The corresponding color, material, and texture set in the loading information segment 85 are designated for the current texture (steps S21, S24, and S27, respectively). After the designation, the next instruction segment is read (step S38), and the process returns to step S19.

If none of the color designating instruction, the material designating instruction, and the texture designating instruction has been read in steps S19, S22, and S27, respectively, it is determined whether or not a normal designating instruction has been read (step S28). If the normal designating instruction has been read, a parameter for a normal vector is acquired (step S29), and normals of the current vertices are set (step S30). Then, the process proceeds to step S38.

If the normal designating instruction has not been read, it is determined whether or not a texture vertex designating instruction has been read (step S31). If the texture vertex designating instruction has been read, parameters for coordinates of texture vertices are acquired (step S32), and the current texture vertices are set (step S33). Then the process proceeds to step S38.

If the texture vertex designating instruction has not been read, it is determined whether or not a vertex rendering instruction for the primitive has been read (step S34). If the vertex rendering instruction has been read, parameters for vertex coordinates are acquired (step S35), and vertices of the primitive are set (step S36). Then, the process proceeds to step S38. For example, if the type of a primitive is a triangle, when three vertices are designated, the triangle having the current texture, the current material, or the current color is rendered.

The processing described above is repeated until a rendering termination declaration instruction appears. In other words, it is determined whether or not the rendering termination declaration instruction appears (step S37). If it is determined that no rendering termination declaration instruction appears, the next instruction segment is read in step S38, and the process returns to step S19. If the rendering termination declaration instruction appears, a corresponding three-dimensional graphics API is called, and a rendering instruction is issued to the 3D graphics rendering engine 61a shown in FIG. 4 (step S39).

Such processing is repeated until all the data in the run-time information segment 86 has been read. In other words, it is determined whether or not reading of the run-time information segment 86 has been completed (step S40). If it is determined that all the data in the run-time information segment 86 has been read, the rendering process terminates. If all the data has not been read, the processing steps from step S12 are repeated.

The structure of the scene graph data and a process performed by the navigation system using the rendering data for the three-dimensional map displayed in accordance with the processes described above will now be described.

Figure 24:
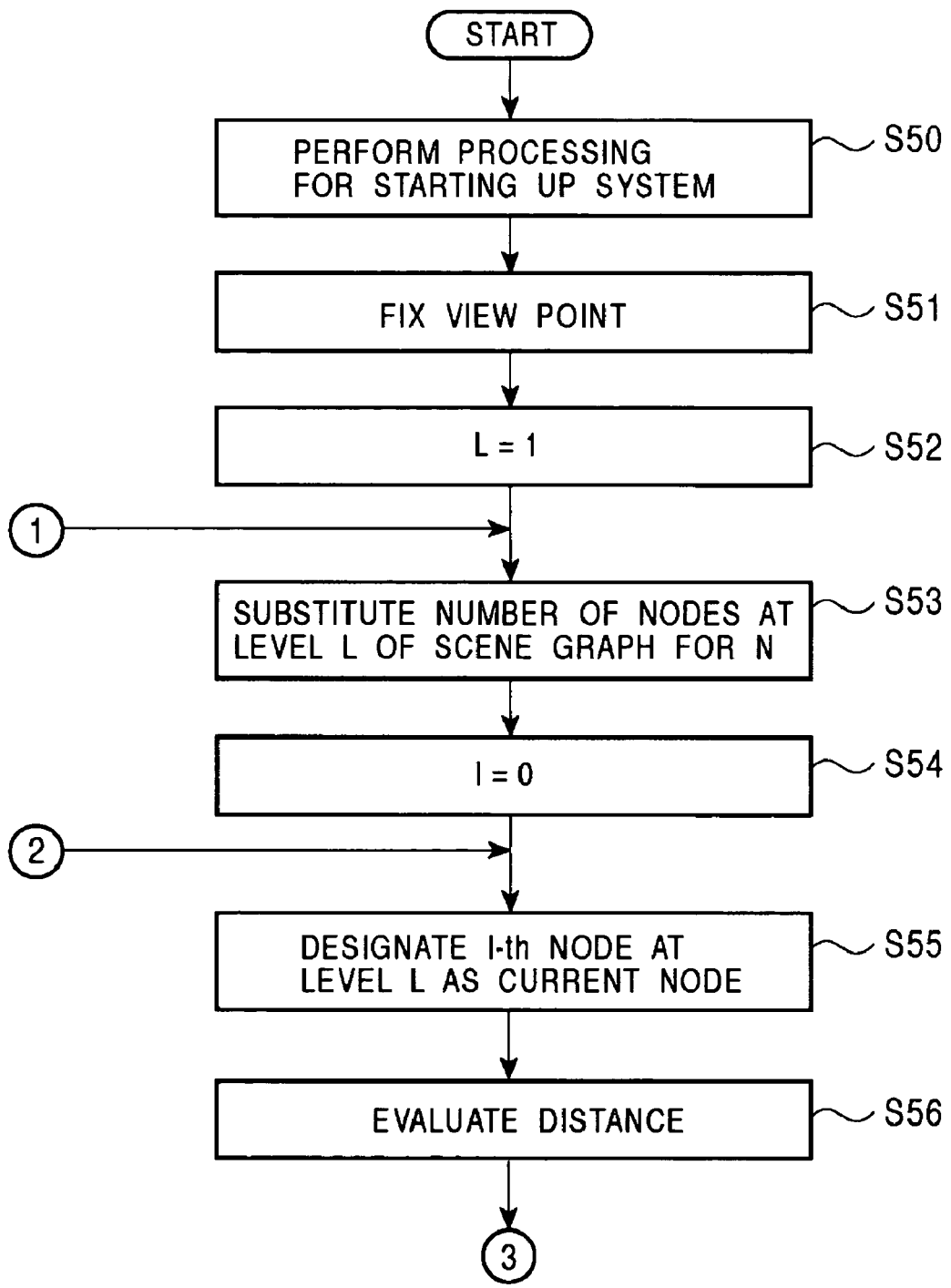
FIGS. 24 and 25 are flowcharts for explaining a process performed by the navigation system.
Figure 25:
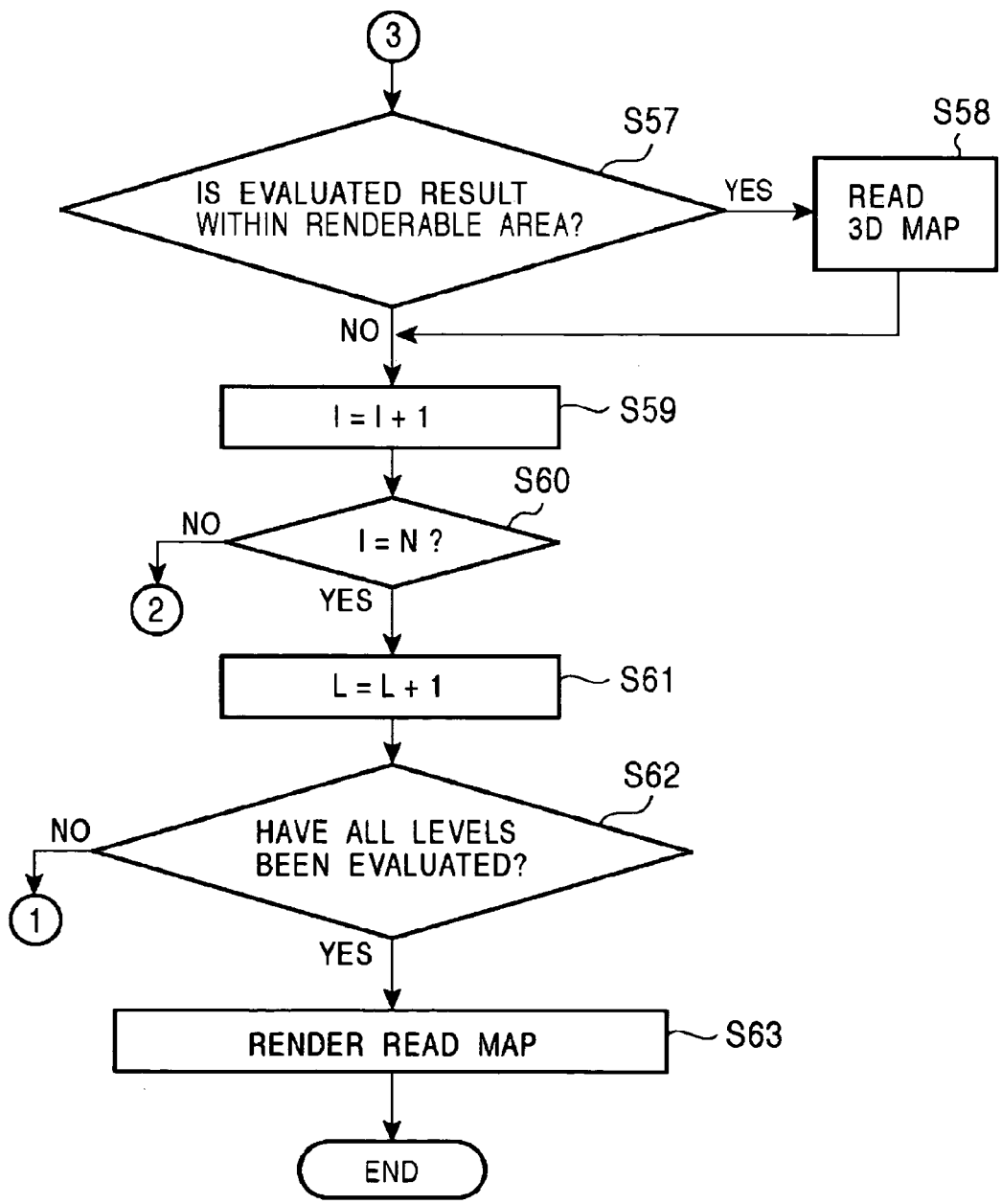

FIGS. 24 and 25 show the process performed by the navigation system.

First, processing necessary for starting up the system is performed under the control of the CPU 61*d* (step S50). The details of step S50 will be described later.

Then, information on a view point set by a user using the external input device 64 is received by the interface 61*e*, and the view point is fixed under the control of the CPU 61*d* (step S51). Then, the CPU 61*d* sets a level L of a node to be searched, which is in a node tree of the scene graph data shown in FIG. 5, to 1 (=root node) (step S52), and the number of nodes at the level L is substituted for the number N of nodes (step S53). For the root node, this value is 1. For each of child nodes of the root node, this value is 4.

Then, a constant I is set to 0 (step S54), and a I-th node at the level L is set to the current node (step S55). Then, the distance of the current node is evaluated (step S56). The details of evaluation of a distance will be explained below.

Figure 40:
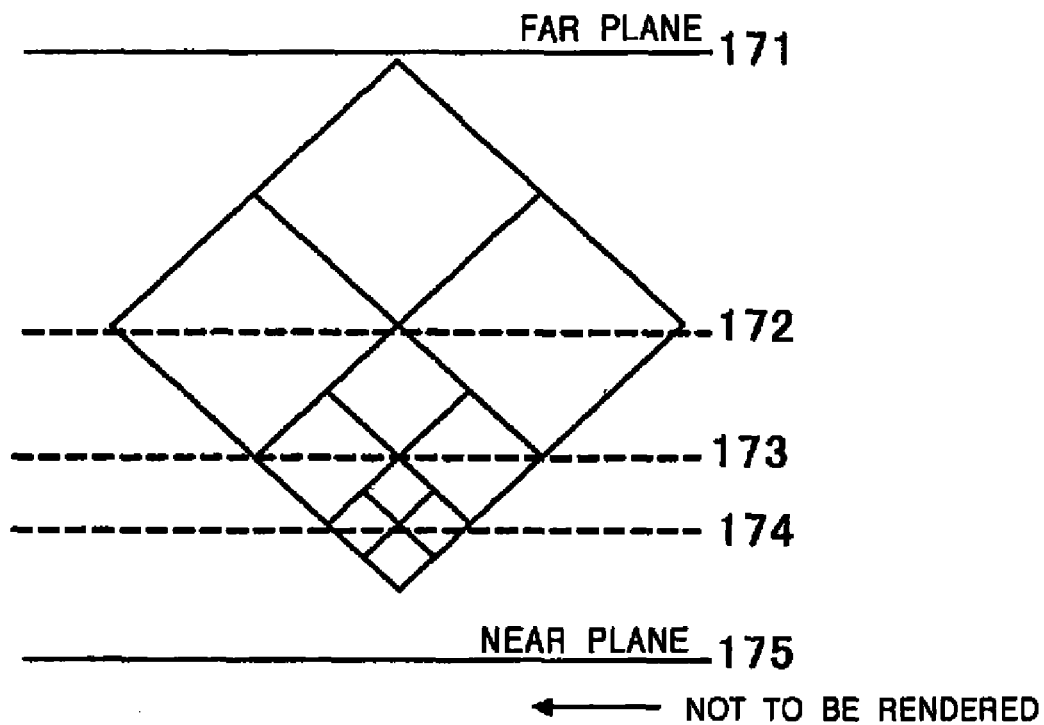

Then, it is determined whether or not a result of the evaluation of the distance of the current node is within a renderable area (step S57). In other words, if the result of the evaluation is within a threshold set for each level, in other words, if the result of the evaluation is shorter than a distance to a boundary, as shown in FIG. 40, rendering data for the map of the area of the corresponding node is read (step S58). Then, the constant I is incremented by 1 (step S59). The processing steps from step S55 are repeated until it is determined that the constant I reaches the number N of nodes at the level L in step S60. If the constant I reaches the number N of nodes at the level L, the level L is incremented by 1 (step S61). The processing steps from step S53 are repeated until it is determined that nodes at all the levels have been evaluated in step S62. If the nodes at all the levels have been evaluated, in accordance with the rendering data for the three-dimensional map read in step S58, the three-dimensional map is rendered using the 3D graphics rendering engine 61a by the processes shown in FIGS. 21, 22, and 23, and is displayed on the display device 62 (step S63).

The details of the evaluation of the distance performed in step S56 in FIG. 24 will now be explained.

Since evaluation of a distance necessary for the process described above is repeated many times, evaluation must be performed at the highest speed possible. Thus, a method described below is used.

Figure 26:
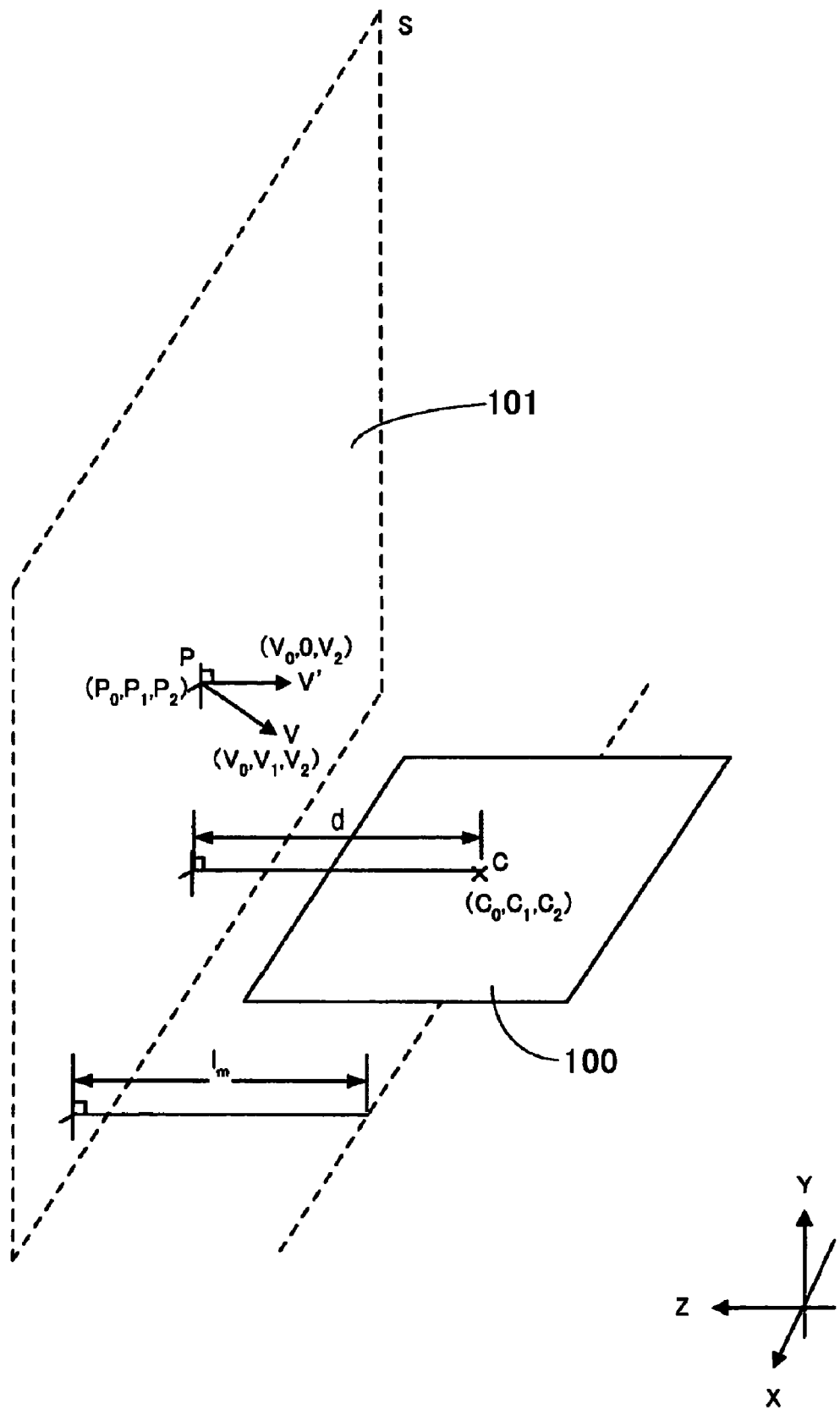
FIG. 26 shows elements necessary for evaluation of a distance.

FIG. 26 shows elements necessary for evaluation of a distance.

Here, the current level is represented by m, and a central point C on a ground surface 100 of the current node whose distance is to be evaluated is represented by coordinates ($C_0$, $C_1$, $C_2$). Then, the position P of a camera is represented by ($P_0$, $P_1$, $P_2$) and a sight line vector V of the camera is represented by ($V_0$, $V_1$, $V_2$).

Furthermore, when a vector V' that has the same X and Z components as the sight line vector V and that is parallel to an XZ-plane is represented by ($V_0$, 0, $V_2$), a plane 101 that has a perpendicular line functioning as the sight line vector V' and that passes a point P is defined. Also, a plane functioning as a reference for distance evaluation for LOD is referred to as a reference plane S.

Also, a distance from the reference plane S to the current ground surface 100 is represented by d, and a distance from the reference plane S to a reference line for determining whether or not to render the ground surface at the current level m is represented by lm.

In accordance with the definition described above, evaluation of a distance is defined as follows:

$$lm > d = |V_0(C_0-P_0)+V_2(C_2-P_2)|/(V_0^2+V_2^2)^{1/2} \quad (1)$$

More specifically, if formula (1) is satisfied, a map on the plane is rendered. Formula (1) indicates a distance from the reference plane S to the central point C of the current ground surface 100. Normally, LOD calculation depends only on the position from a view point. However, evaluating using formula (1) is most effective for three-dimensional maps for navigation. This is because that finely rendering a map of an area close to a screen, as well as a view point (camera position P), is more effective. Also, this is because that a view point (camera position P) close to the ground surface 100 in which a view angle is parallel to the ground surface 100 or a bird's-eye view having an acute angle between the ground surface 100 and the sight line vector V is used for three-dimensional maps for navigation.

Furthermore, distance evaluation by formula (1) limits the dimension of calculation to two dimensions. Thus, distance evaluation reduced by one dimension with respect to normal distance evaluation can be achieved. Therefore, the amount of calculation can be reduced.

Here, in general, for calculation performed by the CPU 61d, a small cost is required for addition and subtraction. Multiplication needs a little increased cost, and special calculation, such as division and square root calculation used in formula (1), needs a large cost. Thus, by simple calculation, an equivalent evaluation formula described below can be derived from formula (1) by eliminating such heavy load.

$$\leftrightarrow lm > d$$

$$\leftrightarrow lm^2 > d^2 \text{ (from } lm, d > 0)$$

$$\leftrightarrow lm^2 - d^2 > 0$$

$$\leftrightarrow lm^2 - (V_0(C_0-P_0)+V_2(C_2-P_2))^2/(V_0^2+V_2^2) > 0$$

$$\leftrightarrow lm^2(V_0^2+V_2^2) - (V_0(C_0-P_0)+V_2(C_2-P_2))^2 > 0 \quad (2)$$

Then, a parameter in which repetition calculation is not needed is defined in advance as a fixed constant. After the view point is fixed (step S51 in FIG. 24), the distance evaluation is performed for many nodes representing ground surfaces. Thus, during that time, since the view point (camera position P) and the sight line vector V are fixed, $V_0$ and $V_2$, which represent the coordinate values, are fixed. Thus, ($V_0^2 + V_2^2$) is also fixed, and this value is set as a constant W in this stage.

Furthermore, since the distance lm is also a fixed constant, $lm^2$ is a constant fixed for each level m. Here, $lm^2$ is defined as Lm. Since this value should always be fixed, this is defined in advance in the processing for starting up the system (step S50 in FIG. 24). Similarly, by defining $V_0(C_0-P_0)+V_2(C_2-P_2)$ as a constant D, the following evaluation formula can be obtained:

$$LmW - D^2 > 0 \quad (3)$$

Figure 27:
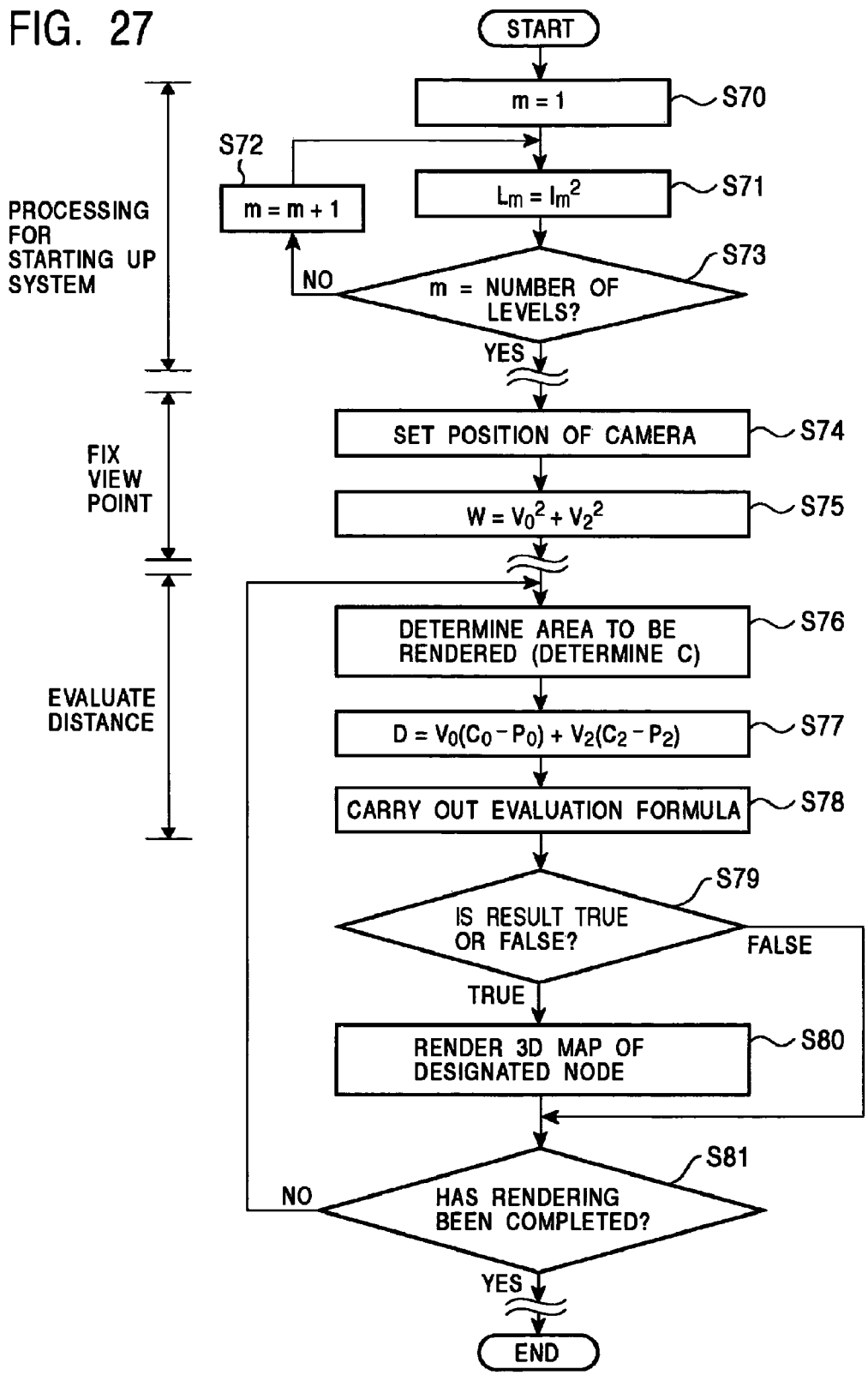
FIG. 27 is a flowchart for explaining a process for determining distance evaluation.

FIG. 27 is a flowchart for explaining a process for determining distance evaluation.

The process for determining distance evaluation is spread over the entire rendering processing, and this process is broadly categorized into three stages.

In a first stage, Lm is calculated as the processing for starting up the system (this calculation is corresponding to step S50 in FIG. 24). Here, the level m is set to 1 (step S70), and a square of a threshold lm set in advance for each level m is substituted for Lm (step S71). The level m is incremented by 1 (step S72) and step S71 is repeated until it is determined that the level m reaches the number of levels of the quadtree in step S73.

In a second stage, processing when a view point is fixed is performed. This processing corresponds to inside processing of step S51 in FIG. 24. In this processing, the camera position is set (step S74), and a view point (camera point P) and a sight line vector V are fixed. Thus, W is calculated (step S75) because $V_0$, $V_2$, $P_0$, and $P_2$ are fixed.

In a third stage, distance evaluation is performed for each node. This processing corresponds to inside processing in step 56 in FIG. 24. In this processing, a node of a rendering area is determined (step S76). Thus, the central point C of the current ground surface 100 is determined. Then, D is calculated (step S77), and evaluation formula (3) is carried out (step S78). It is determined whether the result is true or false (step S79). If the result is determined to be true, the map of the node is rendered (step S80). The processing steps from step S76 are repeated until it is determined that rendering has been completed in step S81. If the result is determined to be false in step S79, the process proceeds to step S81.

Accordingly, performing distance evaluation using evaluation formula (3) significantly reduces a load of the CPU 61d, compared with a case using formula (1) in which multiplication must be performed twice and subtraction must be performed once every use of the evaluation formula, thus achieving calculation at high speed.

The LOD method using the quadtree structure in the scene graph data as described above causes problems described below.

Figure 41:
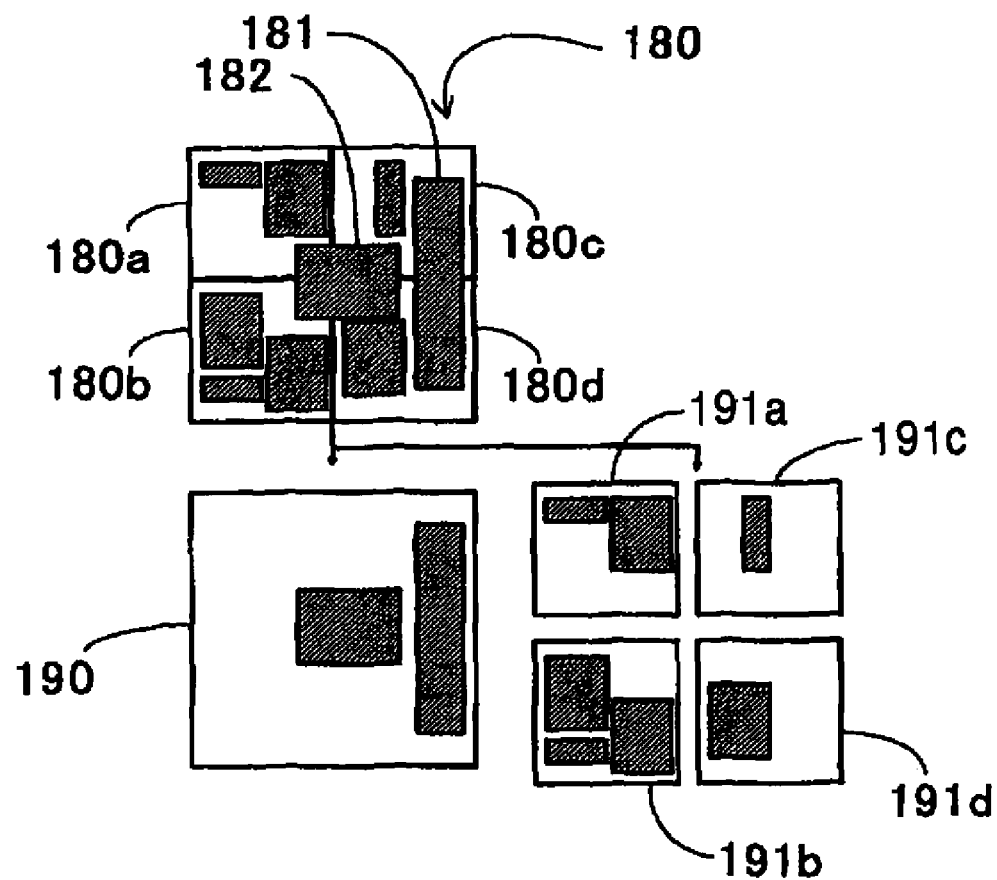

In general, as shown in FIG. 41, in LOD methods using such a quadtree structure, an area to be evaluated is mechanically divided into four areas and hierarchy of nodes in the tree is structured depending on whether an object is within one of the divided areas or not. However, if such methods are used for three-dimensional maps, for example, an object functioning as a landmark that can be seen from a distance, such as Tokyo Tower or other high-rise buildings, may not be displayed on a screen due to LOD processing by mechanical data division even if such an object is located in a viewable position. This is because such an object does not occupy a large area of the ground surface.

A case where height is added as an element in a quadtree structure in scene graph data will be described.

Figure 28:
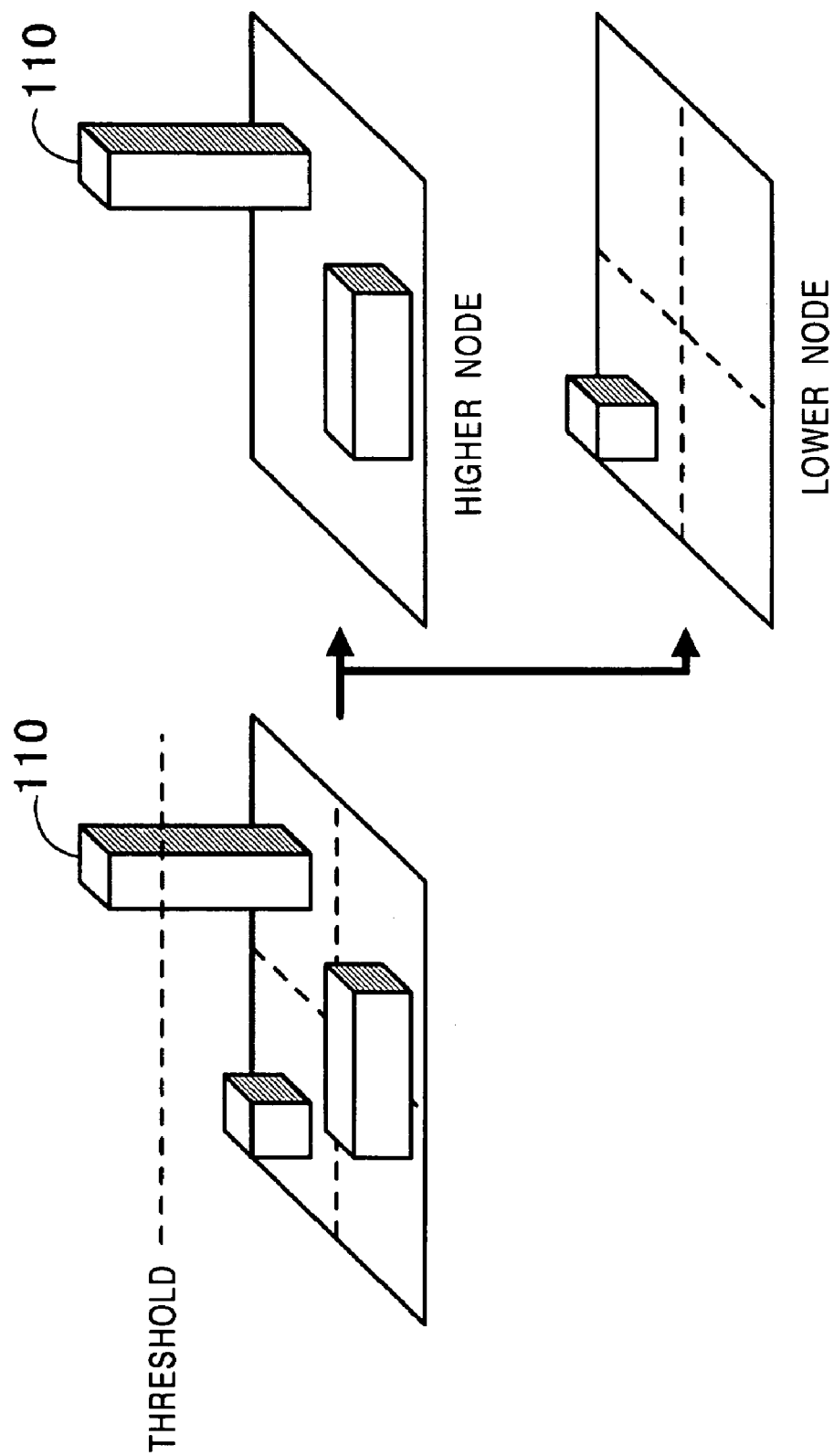
FIG. 28 illustrates a quadtree structure including height as an added element.

FIG. 28 explains a quadtree structure in which height is added as an element.

Although, normally, an object 110 that is within one of divided areas in the quadtree structure is categorized into a lower node, if the height of the object 110 exceeds a threshold, the object 110 is categorized into a higher node.

Accordingly, non-display of a high-rise building that can originally be seen in that position is avoided.

A method for displaying POI information on a point designated by a user in the three-dimensional map data structure will be described.

Figure 29:
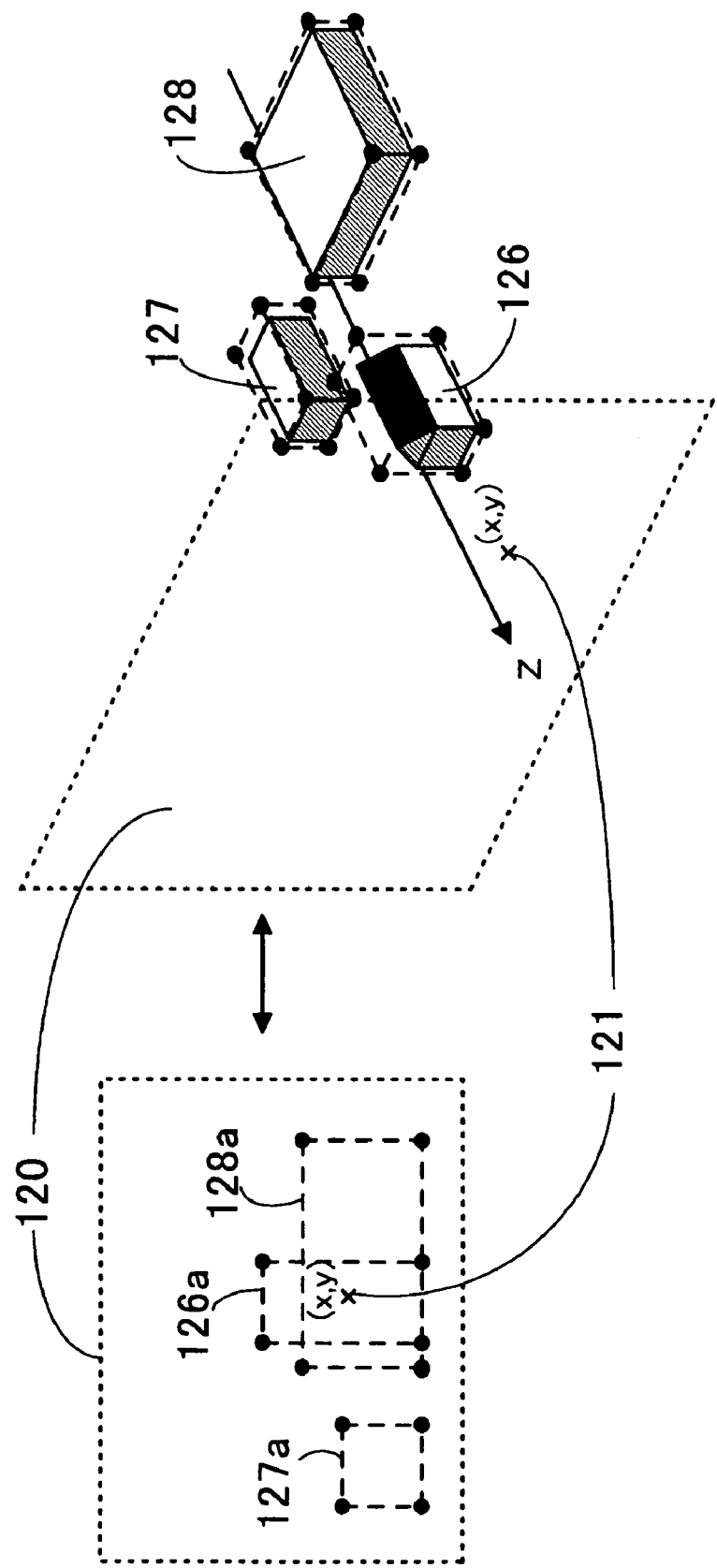
FIG. 29 illustrates a process for specifying a structure designated by a user.

FIG. 29 explains a process for specifying a building designated by a user.

For example, when a user designates a point on a screen of the display device 62 shown in FIG. 4 using a finger or a stylus pen, coordinates of a point 121 corresponding to the point designated by the user on a screen 120 are represented by (x,y). Here, from projection of bounding boxes of objects representing buildings or the like described in the scene graph data shown in FIG. 6 that overlap the coordinates (x,y), an object whose projection is nearest to the screen is specified as a designated building. In the example shown in FIG. 29, from among objects 126, 127, and 128, bounding boxes 126a and 128a of the objects 126 and 128 overlap the coordinates (x,y) on the screen 120. Since the bounding box 126a is located nearer to the screen, the object 126 is designated in this case.

Figure 30:
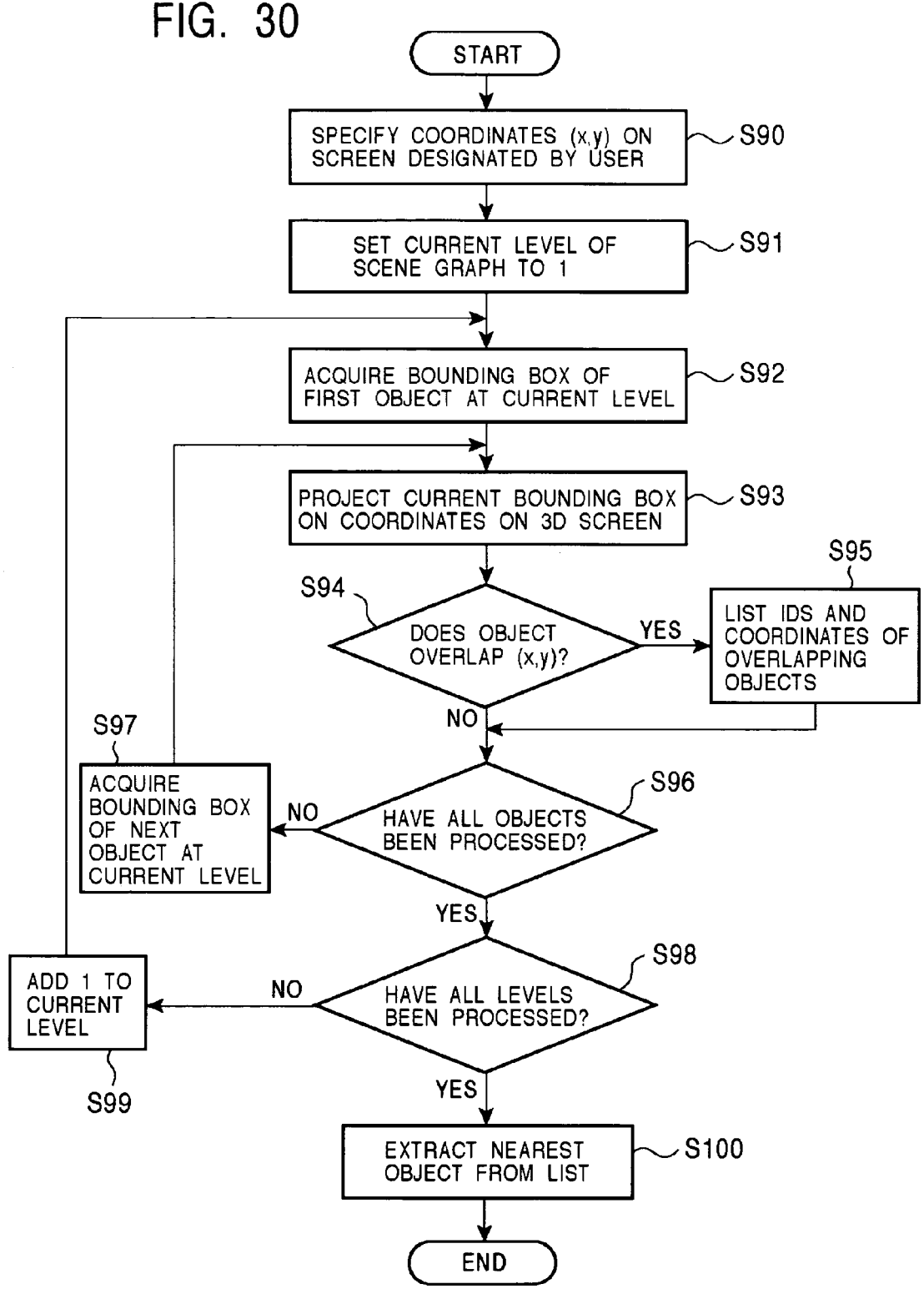
FIG. 30 is a flowchart for explaining the process for specifying the structure designated by the user.

The process for specifying the building designated by the user will now be described with reference to a flowchart shown in FIG. 30.

The CPU 61d specifies the coordinates (x,y) of the point on the screen, as shown in FIG. 29, in accordance with information about the point designated by the user using the external input device 64 or the like (step S90). Then, the scene graph data is searched on the basis of the specified coordinates (x,y). First, the current level is set to 1 (step S91), and a bounding box of an object set at the current level is acquired (step S92). The acquired bounding box is projected on three-dimensional coordinates on the screen (step S93). It is determined whether or not the bounding box overlaps the point (x,y) designated by the user (step S94). If the bounding box overlaps the point (x,y), an ID and coordinates of the object are put into a list and temporarily stored in the RAM 61b (step S95). Then, the process proceeds to step S96. If it is determined that the bounding box does not overlap the point (x,y) in step S94, the process proceeds to step S96.

In step S96, it is determined whether or not all the objects have been processed. If all the objects have not been processed, a bounding box of the next object at the current level is acquired (step S97), and the processing steps from step S93 are repeated. If it is determined that all the objects have been processed in step S96, the process proceeds to step S98.

In step S98, it is determined whether or not all the levels have been searched. If all the levels have not been searched, the current level is incremented by 1 (step S99), and the processing steps from step S92 are repeated. If it is determined that all the levels have been searched in step S98, it is determined that the nearest object in the three-dimensional space from among the coordinates of the bounding boxes of the objects put into the list in step S95 is selected, and the object is extracted (step S100).

Also, since an ID of the selected object corresponds to a tag in the three-dimensional map, special effect rendering, such as magnifying only the selected object to be displayed on the screen or changing the color of the selected object, can be performed.

For such interaction of three-dimensional maps described above, when a wide-area map for an urban area in which many buildings exist is displayed, designating a particular building may be difficult. For example, even if a user wants to designate a high-rise building on the screen, when the process shown in FIG. 30 is mechanically applied, it may be difficult to determine that the user designates the wanted building because there are many small and medium-sized buildings around the wanted building. In step S98 in FIG. 30, if the limitation of the level of the scene graph data for searching is set to a lower level of detail than a level in which an object actually exists, only buildings larger than a predetermined threshold and higher than a predetermined threshold are left. Thus, users can easily perform searching. Also, since the number of objects to be searched is reduced, time spent for searching is reduced. This processing is performed, for example, as described below.

Figure 31:
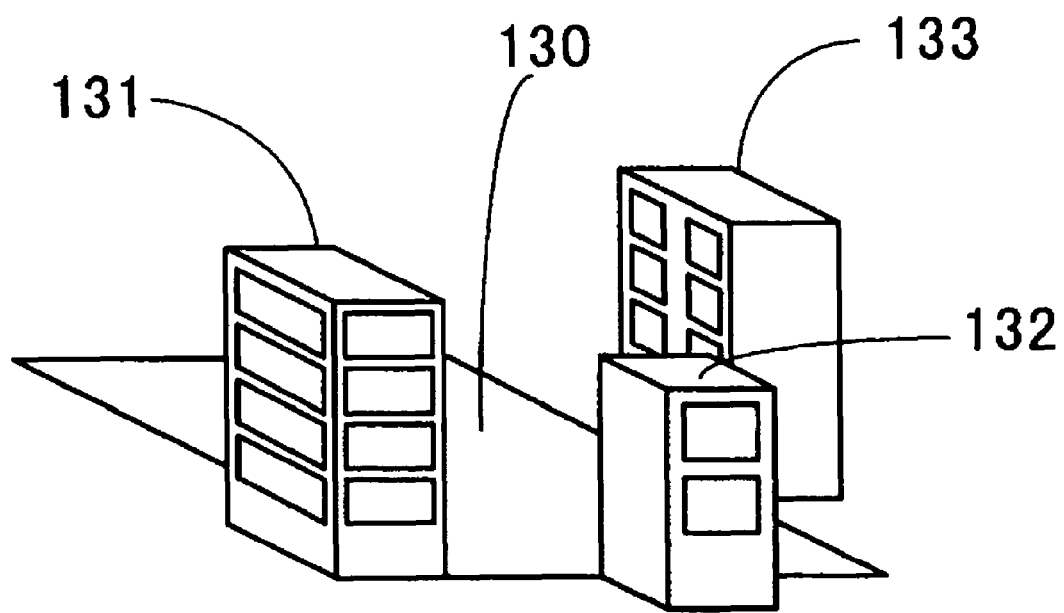
FIGS. 31 and 32 illustrate searching for an object when a level to be searched is limited.
Figure 32:
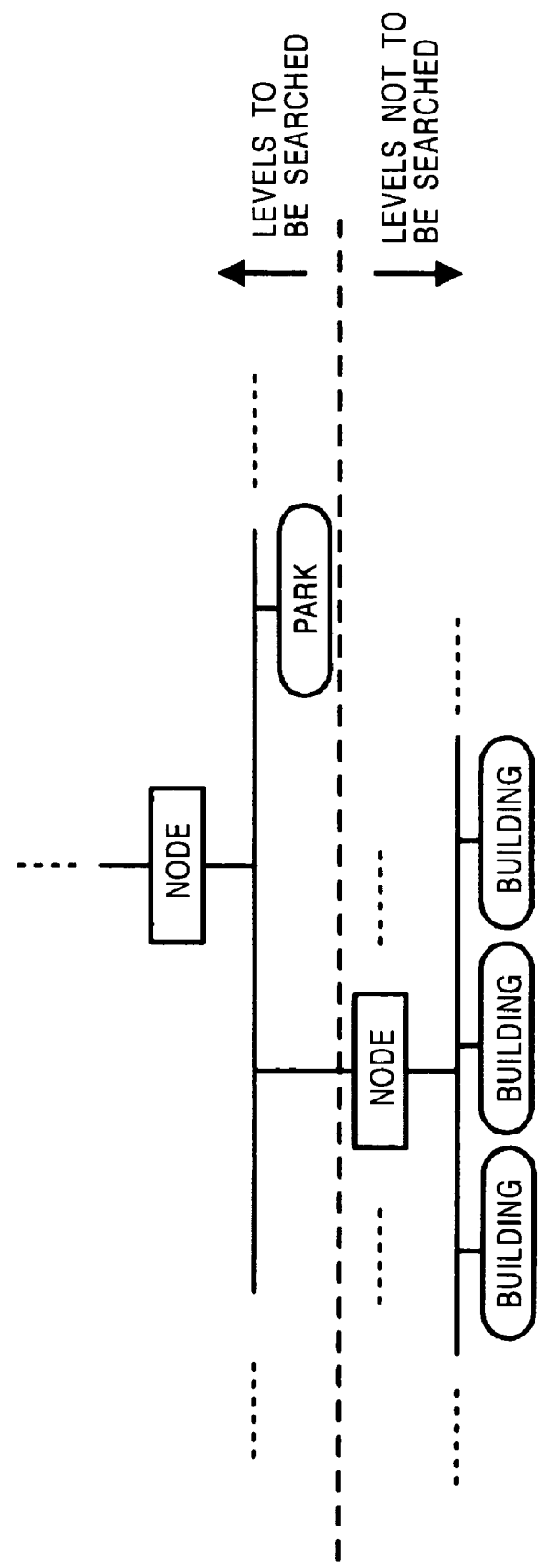
Figure 33A:
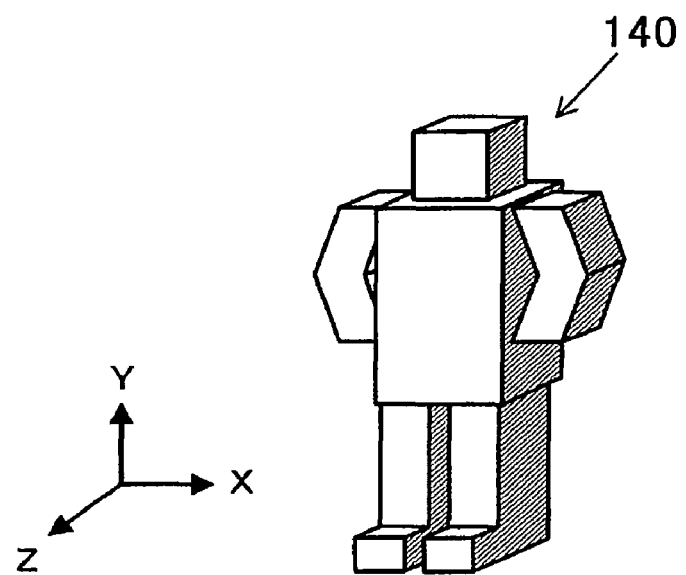
FIG. 33A shows an example of a three-dimensional robot as an object structured using a scene graph.
Figure 33B:
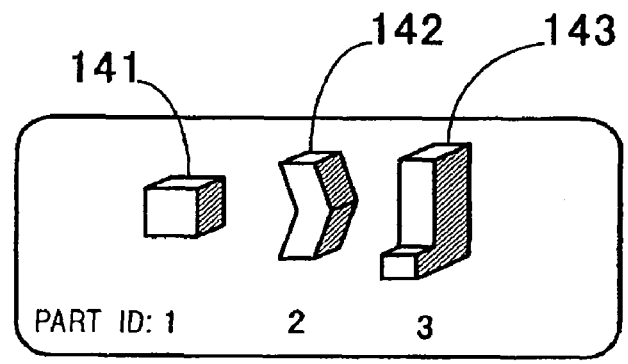
FIG. 33B shows an example of parts constituting the object.
Figure 34:
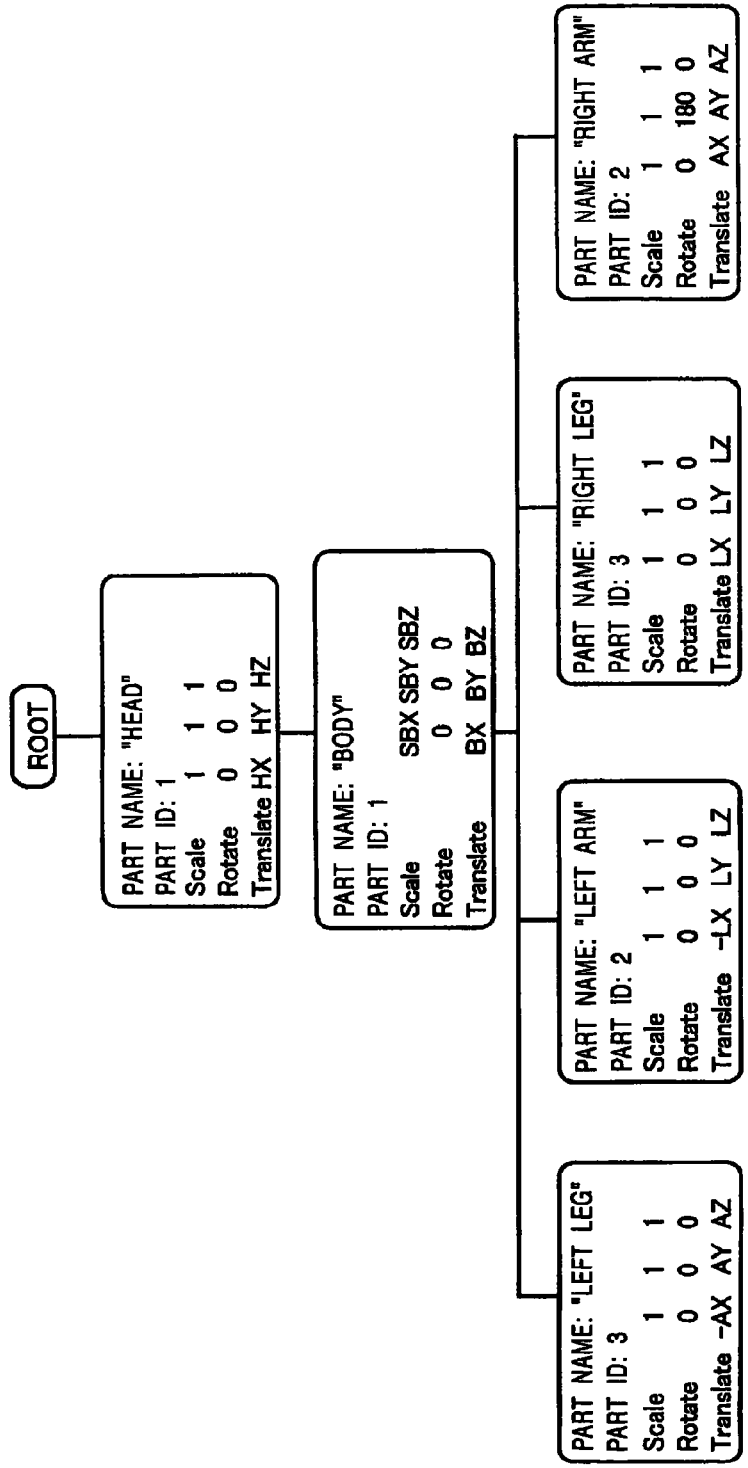
FIG. 34 shows an example of the scene graph showing the structure of the object shown in FIG. 33A.
Figure 35:
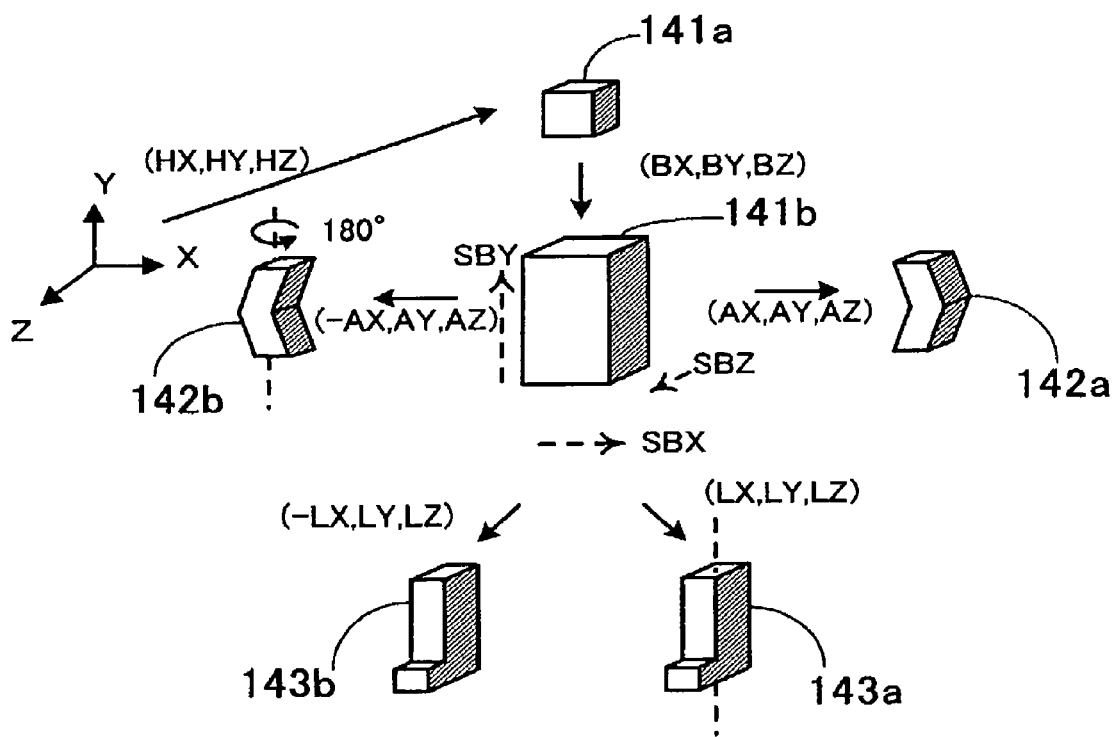
FIG. 35 shows an arrangement of the parts constituting the object represented using the scene graph.
Figure 36:
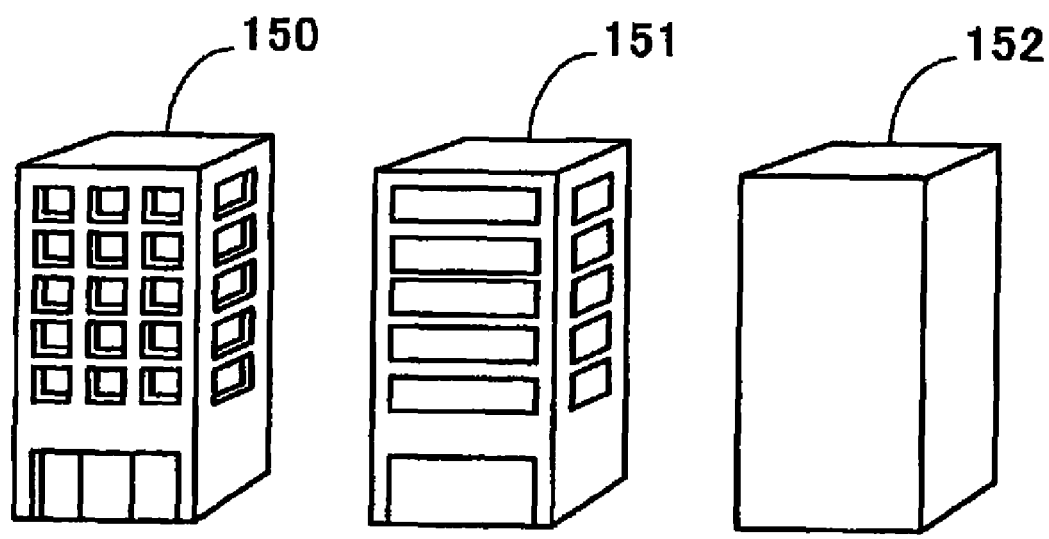
Figure 37:
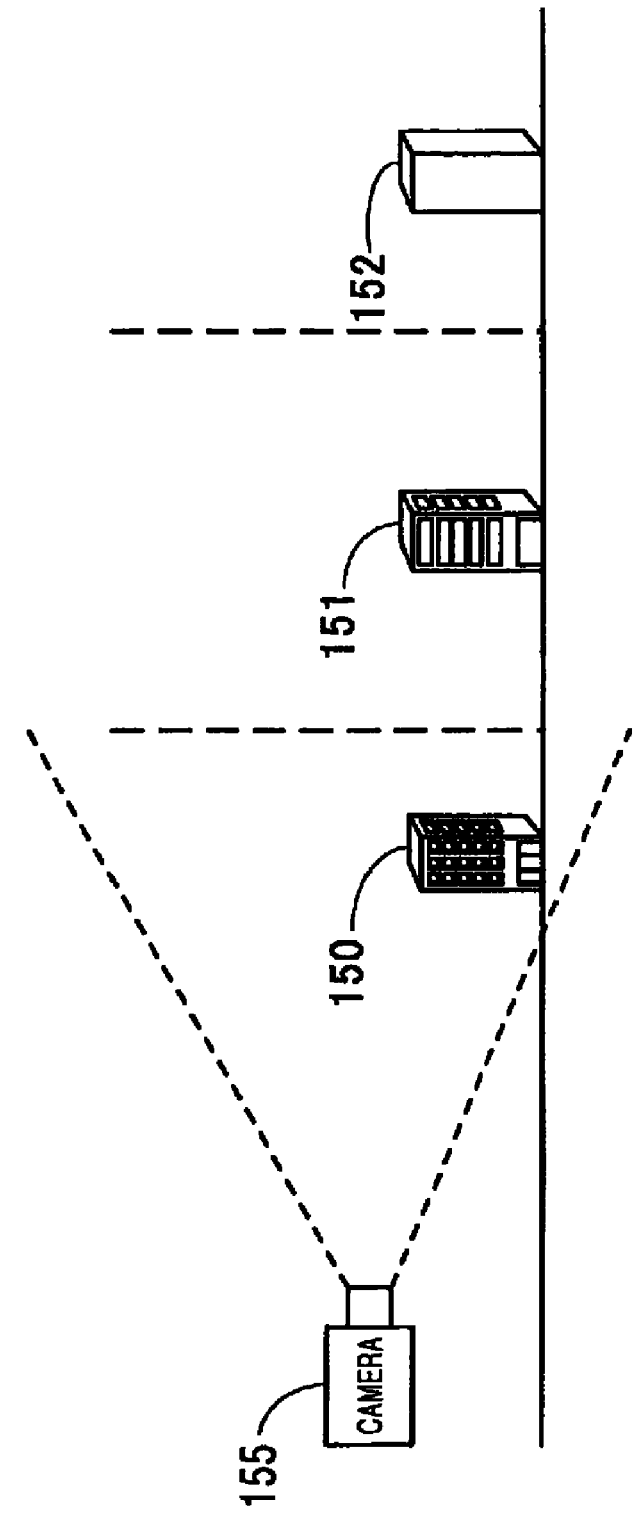
Figure 39:
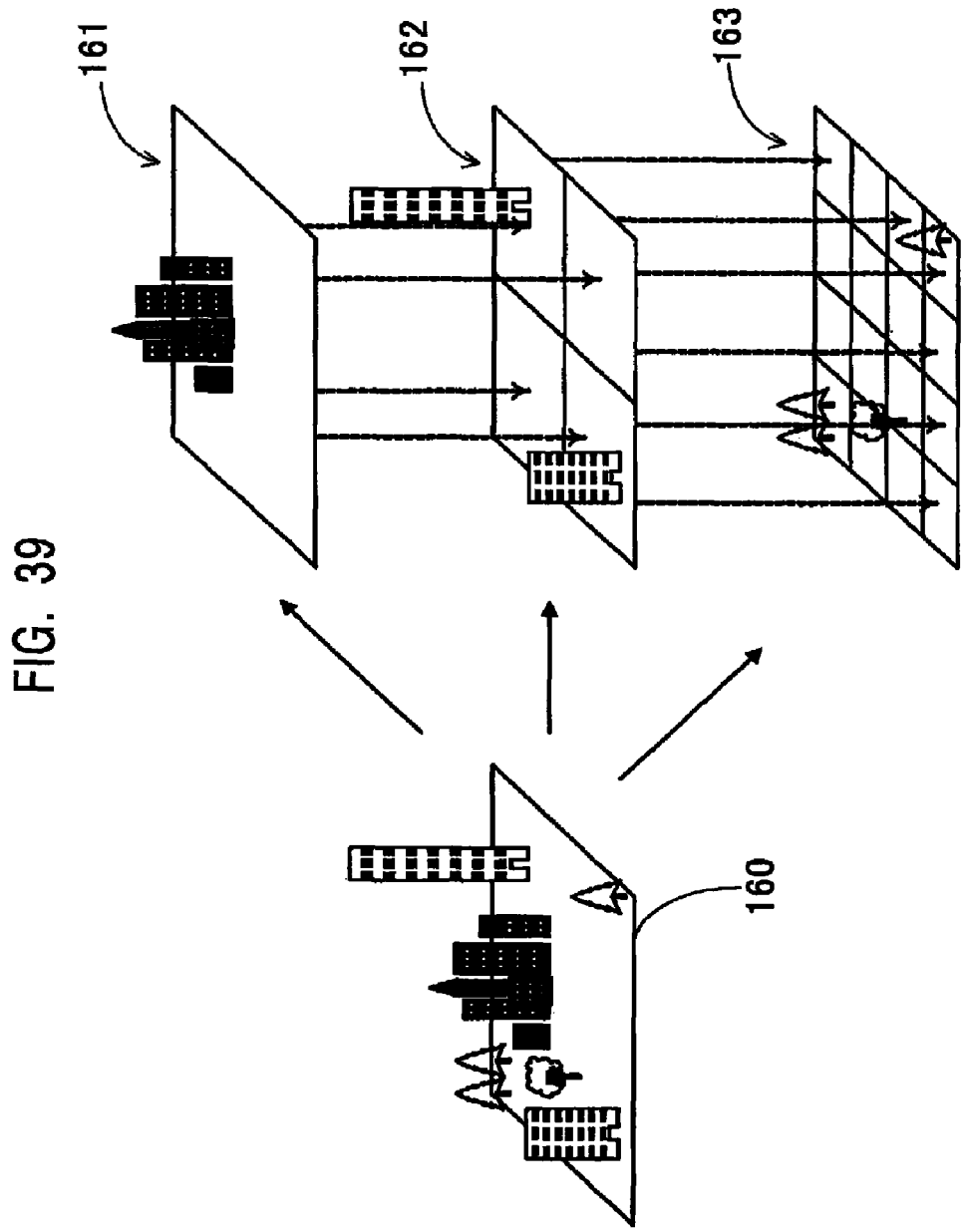
FIGS. 39 to 41 illustrate a quadtree structure.

FIGS. 31 and 32 explain searching of an object when a level to be searched is limited.

If a user wants to designate a park 130 on a screen shown in FIG. 31, since the park 130 is surrounded by various buildings 131, 132, and 133, the park 130 is difficult to designate. In such a case, since there is a distinct difference between the size of the park 130 and the sizes of the buildings 131, 132, and 133, the park 130 belongs to a level different from the buildings 131, 132, and 133 in the scene graph data. Thus, by dividing the scene graph data into levels to be searched and levels not to be searched, as shown in FIG. 32, the park 130 can be easily designated by the user. In other words, if scene graph data at higher levels of details than a predetermined level is set not to be searched, a desired point can be easily designated.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A map display system having a function to display a three-dimensional map, the map display system comprising:
   at least one display device;
   at least one processor; and
   at least one memory device storing instructions which, when executed by the at least one processor, cause the at least one processor to operate with the at least one display device to:
   (a) categorize three-dimensional map data into:
      (i) scene graph data representing a data structure of the three-dimensional map using a tree structure having a plurality of hierarchical nodes, each of a plurality of objects included in the three-dimensional map being categorized into one of the hierarchical nodes; and
      (ii) rendering data for rendering each of the objects, the rendering data including a map information segment, a loading information segment, and a run-time information segment, each of the objects having:
- (A) a height above a ground surface;
- (B) a position; and
- (C) a size, the size being distinct from the height above the ground surface;

(b) for a first one of the objects categorized in a first one of the hierarchical nodes and having a first size and a first position:
- (i) if the height of the first one of the objects exceeds a threshold value, change the categorization of the first one of the objects from the first one of the hierarchical nodes to a second different one of the hierarchical nodes, the second one of the hierarchical nodes being configured to include objects having heights exceeding the threshold value and objects having heights not exceeding the threshold value;
- (ii) if the height of the first one of the objects does not exceed the threshold value, do not change the categorization of the first one of the objects from the first one of the hierarchical nodes to the second one of the hierarchical nodes; and
- (iii) categorize point of interest data for the first one of the objects;

(c) specify a display area by referring to the scene graph data;

(d) read and display the rendering data and point of interest data in accordance with the specified display area; and (e) determine a level of detail based on a view point and a sight line in accordance with a distance from the view point to a ground surface of the three-dimensional map represented by a node.

2. The map display system of claim 1, wherein the map information segment includes map information data, the loading information segment includes loading information data, and the run-time information segment includes run-time information data.

3. The map display system of claim 1, wherein the loading information segment includes material data, texture data and color data.

4. The map display system of claim 1, wherein a dimension of calculation for determining the level of detail is limited to two dimensions.

5. A map data processing apparatus for processing three-dimensional map data, the map data processing apparatus comprising:
at least one processor; and
at least one memory device storing instructions which, when executed by the at least one processor, cause the at least one processor to:
- (a) categorize point of interest data;
- (b) categorize the three-dimensional map data into:
  - (i) scene graph data representing a data structure of a three-dimensional map using a tree structure having a plurality of hierarchical nodes each of a plurality of objects included in the three-dimensional map being categorized into one of the hierarchical nodes; and
  - (ii) rendering data for rendering each of the objects and point of interest data of at least one of the objects, the rendering data including a map information segment, a loading information segment, and a run-time information segment, each of the objects having:
    - (A) a height above a ground surface;
    - (B) a position; and
    - (C) a size, the size being distinct from the height above the ground surface;
- (c) for a first one of the objects categorized in a first one of the hierarchical nodes and having a first size and a first position:
  - (i) if the height of the first one of the objects exceeds a threshold value, change the categorization of the first one of the objects from the first one of the hierarchical nodes to a second different one of the hierarchical nodes, the second one of the hierarchical nodes being configured to include objects having heights exceeding the threshold value and objects having heights not exceeding the threshold value; and
  - (ii) if the height of the first one of the objects does not exceed the threshold value, do not change the categorization of the first one of the objects from the first one of the hierarchical nodes to the second one of the hierarchical nodes; and
- (d) determine a level of detail based on a view point and a sight, line in accordance with a distance from the view point to a ground surface of the three-dimensional map represented by a node.

6. The map data processing apparatus of claim 5, wherein the hierarchical nodes are at a plurality of different hierarchical levels depending on the level of detail of the three-dimensional map.

7. The map data processing apparatus of claim 6, wherein the instructions, when executed by the at least one processor, cause the at least one processor to divide each of the hierarchical nodes in the tree structure into four nodes at each of the hierarchical levels.

8. The map data processing apparatus of claim 6, wherein the instructions, when executed by the at least one processor, cause the at least one processor to operate with at least one display device to, for a hierarchical node at a lower level of detail, display an object higher than a predetermined threshold.

9. The map data processing apparatus of claim 5, wherein the tree structure is written in an XML format.

10. The map data processing apparatus of claim 5, wherein the rendering data is written in a sequential execution data format.

11. The map data processing apparatus of claim 5, wherein the instructions, when executed by the at least one processor, cause the at least one processor to add tag information for associating the scene graph data with the rendering data.

12. The map data processing apparatus of claim 5, wherein the map information segment includes map information data, the loading information segment includes loading information data, and the run-time information segment includes run-time information data.

13. The map data processing apparatus of claim 5, wherein the loading information segment includes material data, texture data and color data.

14. The map data processing apparatus of claim 5, wherein a dimension of calculation for determining the level of detail is limited to two dimensions.

15. A map display apparatus having a function to display a three-dimensional map, the map display apparatus comprising:
at least one display device;
at least one processor; and at least one memory device storing instructions which, when executed by the at least one processor, cause the at least one processor to operate with the at least one display device to:
  (a) store scene graph data representing a data structure of the three-dimensional map using a tree structure having a plurality of hierarchical nodes, each of a plurality of objects included in the three-dimensional map being categorized into one of the hierarchical nodes, a first one of the objects categorized in a first one of the hierarchical nodes having a first size, a first position and a height above a ground surface;
  (b) if the height of the first one of the objects exceeds a threshold value, change the categorization of the first one of the objects from the first one of the hierarchical nodes to a second different one of the hierarchical nodes, the second one of the hierarchical nodes being configured to include objects having heights exceeding the threshold value and objects having heights not exceeding the threshold value;
  (c) if the height of the first one of the objects above the ground surface does not exceed the threshold value, do not change the categorization of the first one of the objects from the first one of the hierarchical nodes to the second one of the hierarchical nodes;
  (d) store rendering data for rendering each of the objects, the rendering data including a map information segment, a loading information segment, and a run-time information segment;
  (e) categorize point of interest data for at least one of the objects;
  (f) specify a display area by referring to the scene graph data;
  (g) determine a level of detail based on a view point and a sight line in accordance with a distance from the view point to a ground surface of the three-dimensional map represented by a node;
  (h) read the rendering data in accordance with the specified display area; and
  (i) perform display processing based on the read rendering data and point of interest data.

16. The map display apparatus of claim 15, wherein the instructions, when executed by the at least one processor, cause the at least one processor to:
  (a) specify a current position;
  (b) set the view point and the sight line in the three-dimensional map; and
  (c) specify the display area by referring to the scene graph data based on the specified current position, the view point, and the sight line.

17. The map display apparatus of claim 16, wherein the hierarchical nodes are at a plurality of different hierarchical levels depending on a level of detail of the three-dimensional map.

18. The map display apparatus of claim 15, wherein the instructions, when executed by the at least one processor, cause the at least one processor to operate with at least one display device to:
  (a) store point of interest information provided for at least one of the objects;
  (b) search the scene graph data for one of the objects designated by a user on the three-dimensional map displayed by the display processing unit;
  (c) read any point of interest information on the searched object; and
  (d) display any point of interest information.

19. The map display apparatus of claim 18, wherein the instructions, when executed by the at least one processor, cause the at least one processor to reduce a number of objects to be searched by dividing the scene graph data into separate searchable levels, said division being based on the heights of each of the objects, wherein the searchable levels of the scene graph data are limited to be searched.

20. The map display apparatus of claim 15, wherein the map information segment includes map information data, the loading information segment includes loading information data, and the run-time information segment includes run-time information data.

21. The map display apparatus of claim 15, wherein the loading information segment includes material data, texture data and color data.

22. The map display apparatus of claim 15, wherein a dimension of calculation for determining the level of detail is limited to two dimensions.

23. A map display method for displaying a three-dimensional map on a display device, the map display method comprising:
  (a) setting a view point and a sight line in the three-dimensional map;
  (b) causing a map data processing unit to:
    (i) search scene graph data stored in a scene graph data memory unit, the scene graph data representing a data structure of the three-dimensional map using a tree structure having a plurality of hierarchical nodes, each of a plurality of objects included in the three-dimensional map being categorized into one of the hierarchical nodes; and
    (ii) determine whether or not the three-dimensional map represented by each of the hierarchical nodes and what level of detail is displayed based on a view point and the sight line in accordance with a distance from the view point to a ground surface of the three-dimensional map represented by each of the hierarchical nodes; and
  (c) causing a data reading unit to read rendering data for rendering a first one of the objects when the three-dimensional map represented by each of the hierarchical nodes is displayed by the display device, wherein:
    (i) the map data processing unit is configured to determine a size of a first one of the objects categorized in a first one of the hierarchical nodes, the size of the first one of the objects being distinct from a height of the first one of the objects above a ground surface;
    (ii) the map data processing unit is configured to determine a position of the first one of the objects;
    (iii) the map data processing unit is configured to determine the height of the first one of the objects above the ground surface, wherein:
      (A) if the height of the first one of the objects exceeds a threshold value, change the categorization of the first one of the objects from the first one of the hierarchical nodes to a second different one of the hierarchical nodes, the second one of the hierarchical nodes being configured to include objects having heights exceeding the threshold value and objects having heights not exceeding the threshold value; and
      (B) if the height of the first one of the objects does not exceed the threshold value, do not change the categorization of the first one of the objects from the first one of the hierarchical nodes to the second one of the hierarchical nodes; and (iv) the rendering data includes a map information segment, a loading information segment, and a run-time information segment;

(d) causing the data reading unit to read point of interest data for at least one of the objects; and (e) causing a display processing unit to perform display processing on the basis of the read rendering data and point of interest data.

24. The map display method of claim 23, wherein the map information segment includes map information data, the loading information segment includes loading information data, and the run-time information segment includes run-time information data.

25. The map display method of claim 23, wherein the loading information segment includes material data, texture data and color data.

26. The map display method of claim 23, wherein a dimension of calculation for determining the level of detail is limited to two dimensions.

* * * * *